(12) United States Patent
Koh et al.

(10) Patent No.: US 6,801,679 B2
(45) Date of Patent: Oct. 5, 2004

(54) MULTIFUNCTIONAL INTELLIGENT OPTICAL MODULES BASED ON PLANAR LIGHTWAVE CIRCUITS

(76) Inventors: Seungug Koh, 932 Carson Dr., Sunnyvale, CA (US) 94086; Danjin Wu, 932 Carson Dr., Sunnyvale, CA (US) 94086

(*) Notice: Subject to any disclaimer, the term of this patent is extended or adjusted under 35 U.S.C. 154(b) by 142 days.

(21) Appl. No.: 10/303,333

(22) Filed: Nov. 25, 2002

(65) Prior Publication Data

US 2003/0113067 A1 Jun. 19, 2003

Related U.S. Application Data

(60) Provisional application No. 60/332,595, filed on Nov. 23, 2001.

(51) Int. Cl.[7] ............................................. G02B 6/12
(52) U.S. Cl. ........................ 385/14; 385/48; 385/39; 385/49; 385/24; 385/16; 385/18; 438/406; 213/24
(58) Field of Search ..................... 385/14, 48, 39, 385/49, 24, 16, 18; 438/406; 216/24

(56) References Cited

U.S. PATENT DOCUMENTS

| | | | |
|---|---|---|---|
| 5,416,861 A * | 5/1995 | Koh et al. .................... 385/14 |
| 5,761,350 A | 6/1998 | Koh | |
| 6,195,478 B1 * | 2/2001 | Fouquet ....................... 385/17 |
| 6,215,565 B1 | 4/2001 | Davis | |
| 6,341,024 B1 | 1/2002 | Jeong | |
| 6,344,910 B1 | 2/2002 | Cao | |
| 6,363,183 B1 | 3/2002 | Koh | |
| 6,396,051 B1 | 5/2002 | Li | |
| 6,433,901 B2 | 8/2002 | Cao | |
| 6,445,838 B1 | 9/2002 | Caracci | |
| 6,493,088 B1 | 12/2002 | Hui | |
| 6,498,663 B1 | 12/2002 | Farhan | |
| 2002/0034352 A1 * | 3/2002 | Williams et al. ............. 385/16 |
| 2002/0154852 A1 * | 10/2002 | Levine et al. ................. 385/16 |
| 2003/0002777 A1 * | 1/2003 | Ruscchin et al. ............. 385/16 |
| 2003/0161574 A1 * | 8/2003 | Aksyuk et al. ............... 385/16 |
| 2003/0179983 A1 * | 9/2003 | Lacey et al. .................. 385/16 |
| 2003/0202732 A1 * | 10/2003 | Glebov et al. ................ 385/16 |

OTHER PUBLICATIONS

Ippei Shake et. al. Transparent and Flexible Performance Monitoring Using Amplitude Histograim Method, OFC 2002, pp 19–21.

M. Rohde et. al. "Control Modulation Technique for Client Independent Optical Performance Monitoring and Transport of Channel Overhead", OFC 2002, pp 21–22.

C. J. Youn et. al., OSNR Monitoring Technique Based on Orthogonal Delayed—Homodyne Method, OFC 2002, pp 22–24.

Henning Bülow, "Electronic Equalization of Transmission Impairments", OFC 2002, pp 24–25.

* cited by examiner

Primary Examiner—Jared J. Fureman
Assistant Examiner—Allyson N Trail

(57) ABSTRACT

Since the bandwidth-intensive applications such as Internet access, electronic commerce, multimedia applications, and distributed computing are rapidly increasing the volume of telecommunication traffics, optical networks become an essential backbone of telecommunication networks. The optical networks have shown a superior performance/cost ratio for both long-haul and short-haul routes and the emerging dense wavelength division multiplexing and all-optical network technologies have promised a potential to improve speed, capacity and connectivity of telecommunication networks. The present invention provides a multifunctional intelligent optical module (IOM) by integrating a multitude of photonic, electronic, and micro mechanical elements into a single module. The multifunctional IOM is an integrated hybrid microsystem and it applicable to fast network provisioning, reliable protection switching, instant fault detection/correction, guaranteed quality-of-service, accurate optical performance monitoring, and efficient optical transmission engineering.

24 Claims, 14 Drawing Sheets

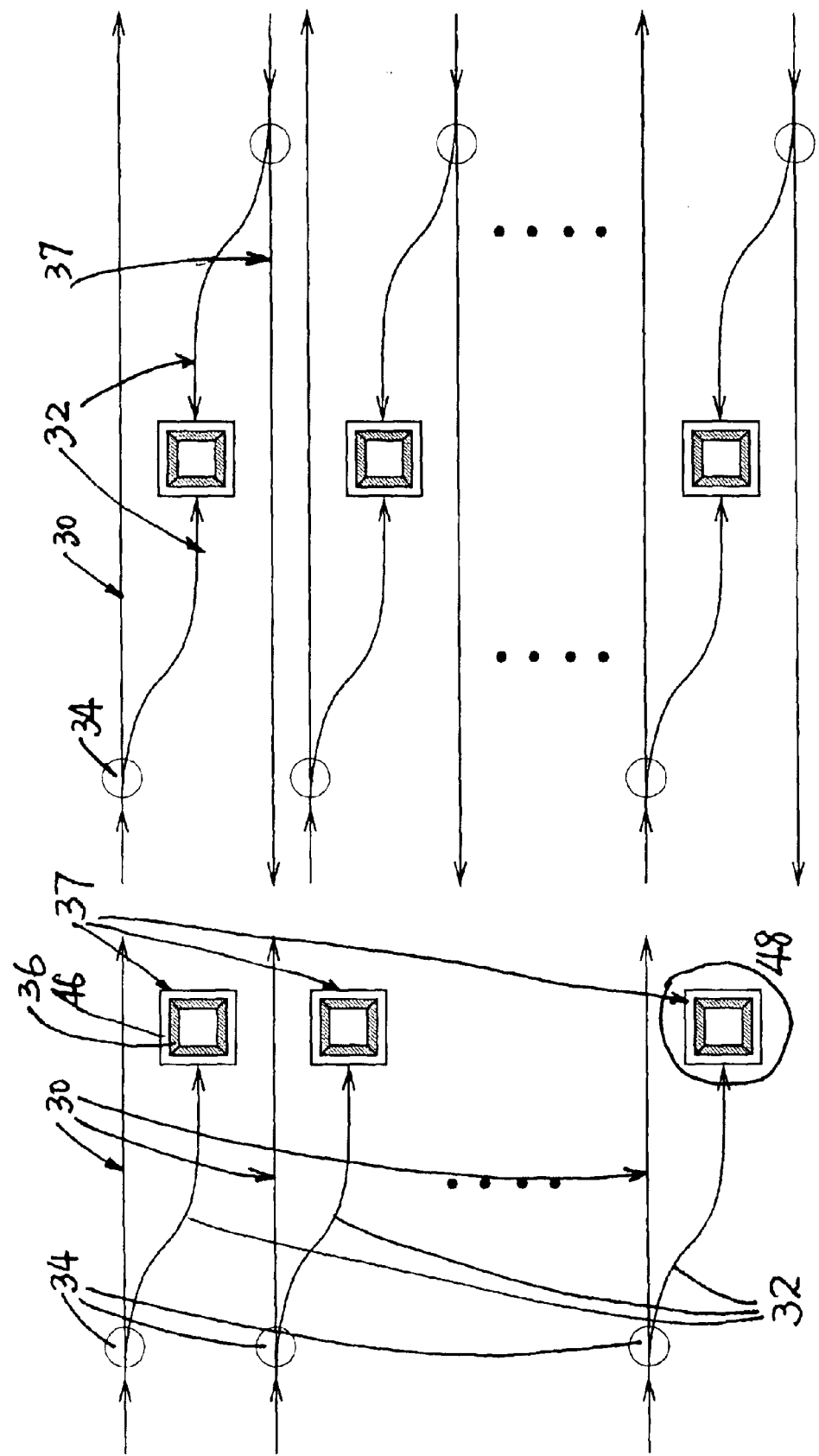

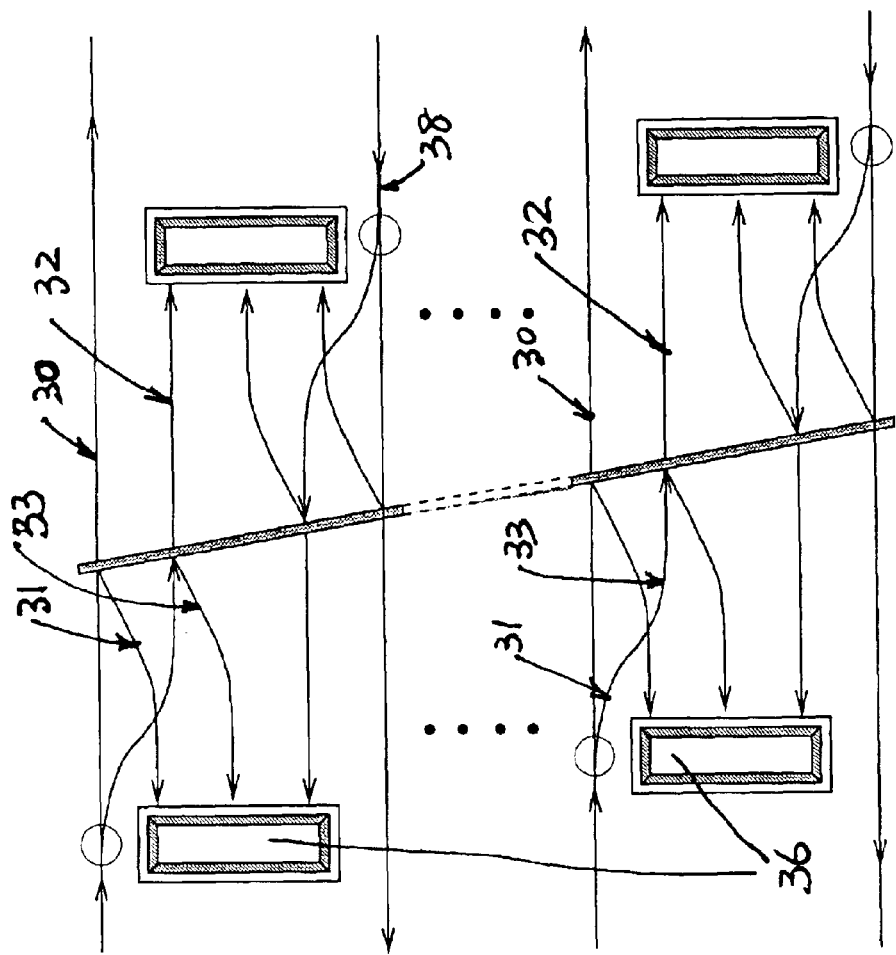
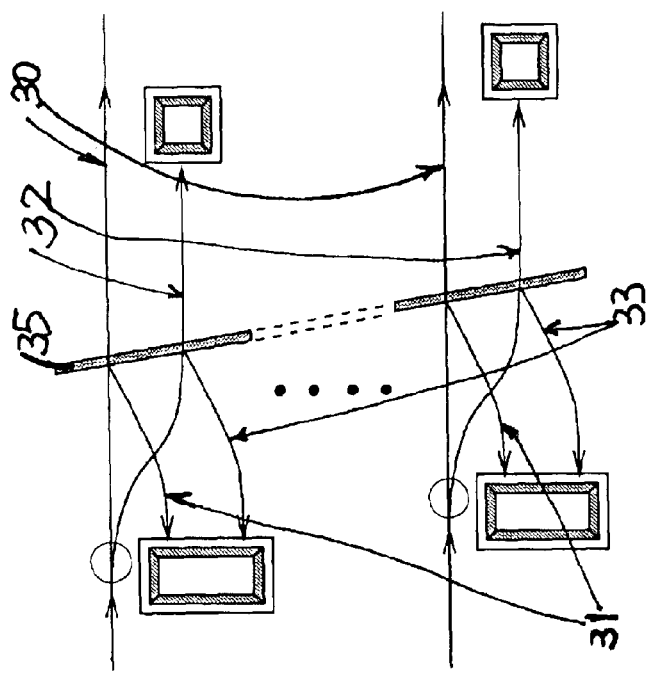
FIG. 3B
FIG. 3A

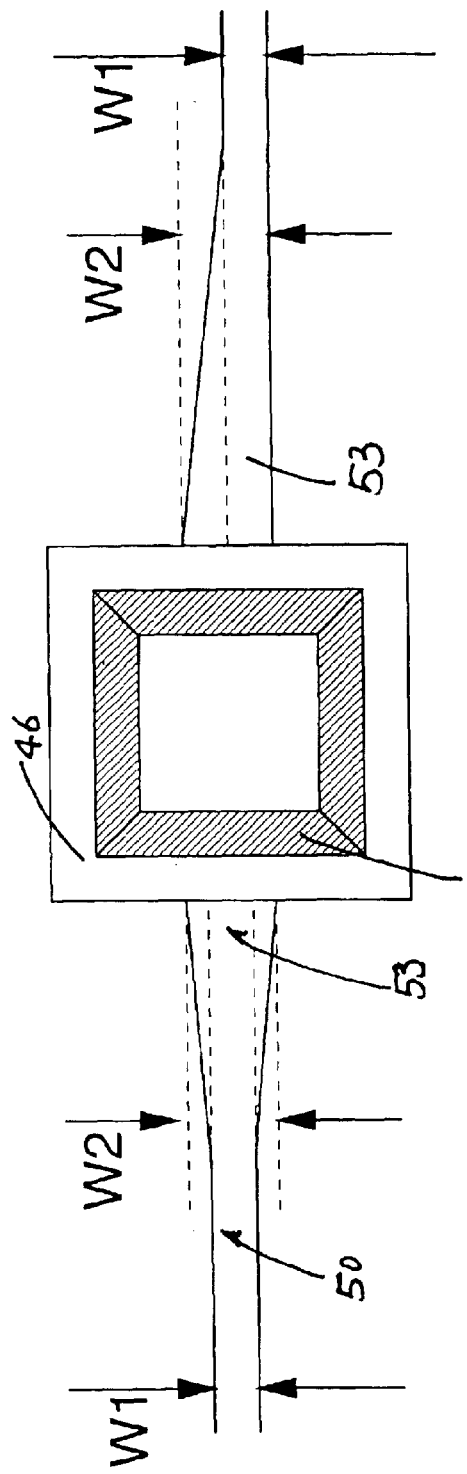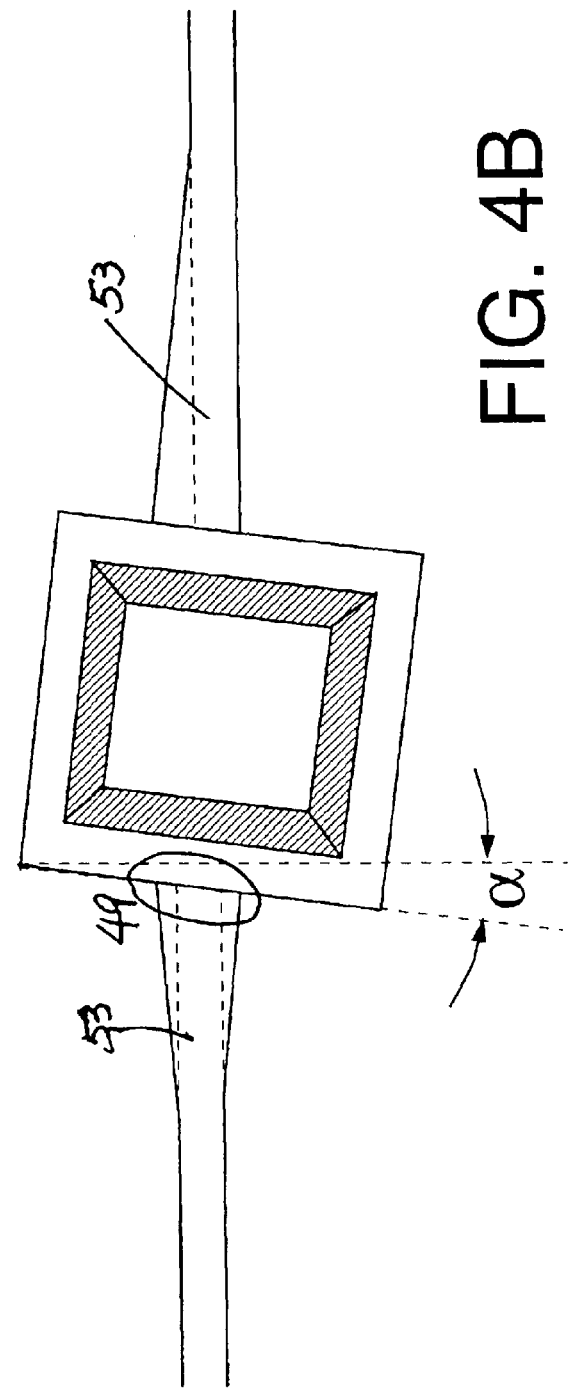

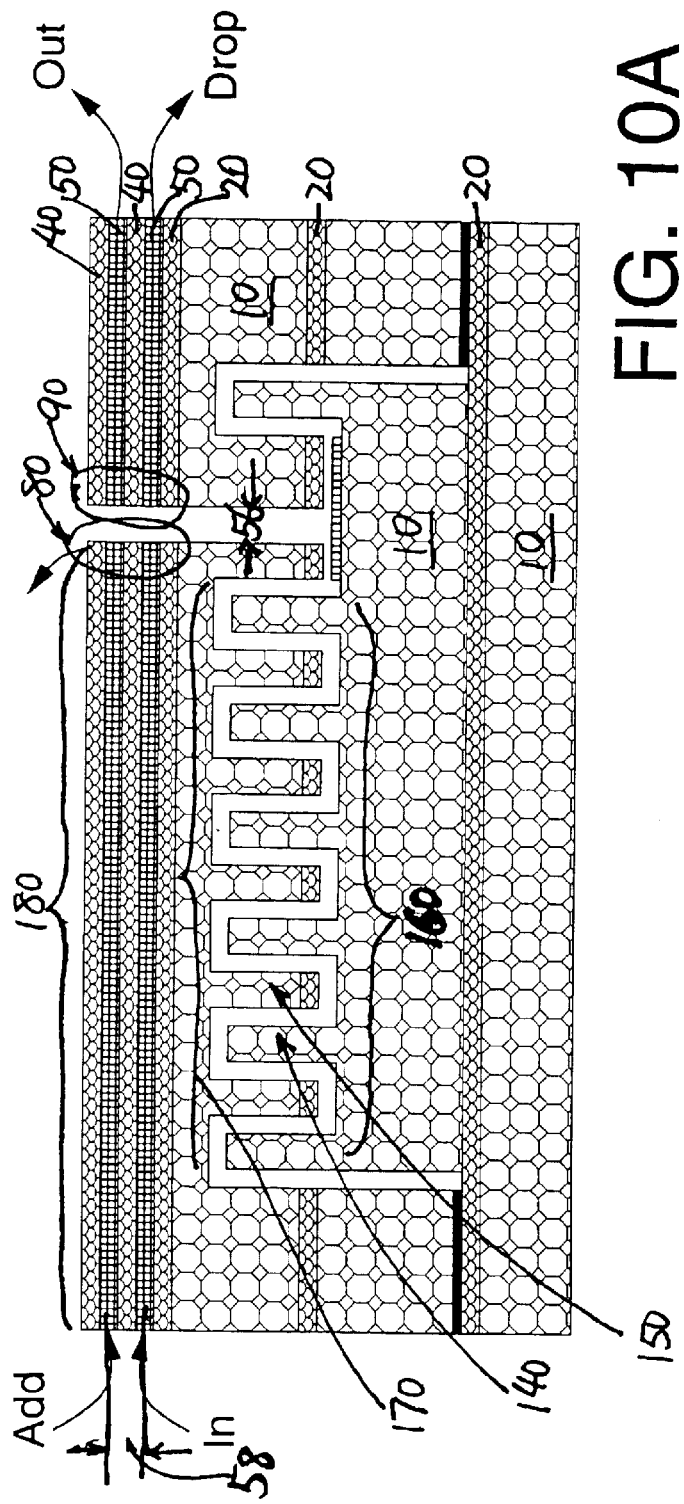

FIG. 10E Out: Add-Drop State

FIG. 10F Out: Pass-Through State

MULTIFUNCTIONAL INTELLIGENT OPTICAL MODULES BASED ON PLANAR LIGHTWAVE CIRCUITS

This is a non-provisional application based upon an earlier-filed provisional application, Ser. No. 60/332,595 filed Nov. 23, 2001.

TECHNICAL FIELD

The present invention relates generally to mixed-technology microsystems to allow a hybrid integration of photonic, electronic, and micro mechanical elements. It is directed particularly to integrated optical modules to combine various functionalities such as optical channel monitoring, variable optical attenuation, DWDM multiplexing & demultiplexing, optical switching, optical amplification, optical add/drop multiplexing, optical cross-connect switching, or any combinations thereof. Specifically the invention is disclosed as multifunctional intelligent optical modules.

BACKGROUND OF THE INVENTION

Bandwidth-intensive applications such as Internet access, electronic commerce, multimedia applications, and distributed computing are rapidly increasing the traffic volumes carried by telecommunication networks. Telecommunication systems employing optical fibers as the transmission medium have delivered superior performance and cost advantage for all classes of optical networks including ultra long-haul core, long-haul core, metro core, and edge networks. The emerging optical network technologies like dense wavelength-division multiplexing (DWDM) and all-optical network (AON) can further promote a high-speed and large-bandwidth network access at low cost.

Although traditional telecommunication service providers have increasingly deployed fiber optic cables for both long-haul and short-haul routes, the ever-increasing network traffic has created some constraints on the existing SONET/SDH-based communication network in terms of speed, capacity, connectivity, and management of networks. The traditional telecommunication service providers generally address these speed, capacity, connectivity, and network management constraints either by installing new fiber cables or by expanding the existing fiber's transmission capacity using high-speed time-division multiplexing (TDM) or DWDM technologies. The formal method is quite expensive and difficult, as it requires a huge investment as well as constant upgrade of the existing fiber network infrastructures. In the latter methods, the DWDM technology increases the number of optical signals, called channels, transmitted simultaneously on a single fiber, whereas the high-speed TDM technology increases a transmission speed of optical signals. The DWDM technology is ideal for a variety of high-capacity networks such as point-to-point or backbone ring networks with minimal switching and routing requirements. AON is a desirable realization of optical networks and some of the essential optical network elements (ONEs) for AON include optical add/drop multiplexer (OADM), optical crossconnect switch (OXC), optical terminal multiplexer (OTM). These ONEs can dramatically improve the efficiency and operation cost of AON compared to the traditional SONET-/SDH-based optical networks by providing "transparency" to modulation format, protocol and signal bit rates. In the traditional SONET/SDH-based optical networks, the transmission signals within optical networks must be frequently converted between optical and electrical forms. For instance, optical signals should be converted to electrical one at switching ports of SONET/SDH-based network elements and the routing information in the information packet should be analyzed and utilized for a proper signal routing. Then the electrical signal must be converted to optical one for a subsequent signal routing and transmission. These optical-to-electrical and optical-to-electrical signal conversions reduce overall network efficiencies, since it introduces delays and noises. The AON can eliminate these unnecessary signal conversions through the use of transparent ONEs to reduce costs and improve efficiencies. For all of these traditional SONET/SDH-based optical networks and contemporary optical networks of high-speed TDM, multi-channel DWDM, and transparent AON, efficient and intelligent utilization of optical networks is essential for fast network provisioning, reliable protection switching, instant fault detection/correction, guaranteed quality-of-service (QoS), accurate optical performance monitoring, and optimal optical transmission engineering. In particular multifunctional intelligent optical module (IOM) for integrated services and intelligent functionalities are very useful to ONEs in order to manage and to control the optical networks in an efficient and profitable manner.

SUMMARY OF THE INVENTION

Accordingly, it is a primary objective of the present invention to provide a multifunctional intelligent optical module (IOM) platform for efficient and intelligent utilization of optical networks.

It is another objective of the present invention to provide unidirectional and bi-directional optical channel monitors with or without spectral filtering based on the multifunctional IOM platform.

It is yet another objective of the present invention to provide diverse and integrated functionalities of dynamic channel controlling, dynamic VOA multiplexing, and smart optical switching based on the multifunctional IOM platform.

Another objective of the present invention is to provide a method of monitoring and controlling Quality-of-Service (QoS) per individual optical wavelength channel with variable priorities by using the multifunctional IOM platform.

It is a further objective of the present invention to provide a method of constructing silicon mirror arrays with a small footprint size to be used for the multifunctional IOM platform.

It is yet a further objective of the present invention to provide a vertical optical switch in order to allow optical signals being routed among vertically positioned cores located at different layers of planar lightwave circuits with multiple waveguide layers.

It is yet another further objective of the present invention to provide monolithically integrated smart OADM module by using two waveguide layers on planar lightwave circuits by integrating DWDM mutiplexer/demultiplexer filters, vertical optical switches, optical channel monitors, and VOAs into a multifunctional IOM platform.

Additional objectives, advantages and other novel features of the invention will be set forth in part in the description that follows and in part will become apparent to those skilled in the art upon examination of the following or may be learned with the practice of the invention. To achieve the foregoing and other objectives, and in accordance with one aspect of the present invention, the multifunctional IOM platform is provided to integrate multiple electronic & photonic devices and components by using planar lightwave circuits (PLC). Still other objective of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawing:

FIG. 2 (comprising FIGS. 2A–2B) is a diagrammatic view of unidirectional and bi-directional optical channel monitors.

FIG. 3 (comprising FIGS. 3A–3B) is a diagrammatic view of unidirectional and bi-directional configurations of spectral optical channel monitors.

FIG. 4 (comprising FIGS. 4A–4B) is a detailed diagrammatic view of multifunctional IOM platform, showing the tapered cores and tilted cores of signal-tap waveguides terminated at micromachined trenches for optical I/O coupling.

DETAILED DESCRIPTION OF THE PREFERRED EMBODIMENT

Figure 1A:
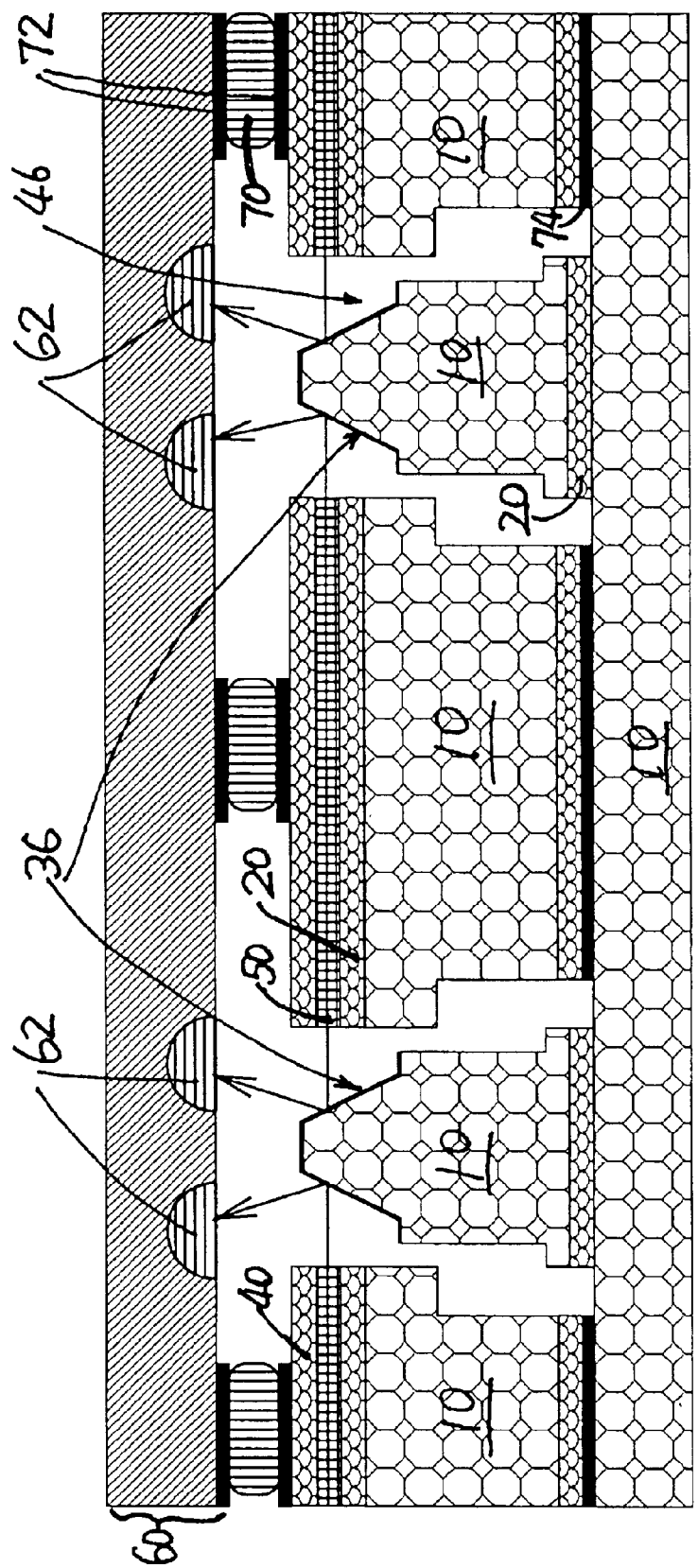
FIG. 1 (comprising FIGS. 1A–1B) is cut-away side elevation views of multifunctional IOM platform with optical I/O couplers, constructed according to the principles of the present invention.

Reference will now be made in detail to the present preferred embodiment of the invention, an example of which is illustrated in the accompanying drawings, wherein like numerals indicate the same elements throughout the views.

Optical transport and access networks (OTAN) can generally be classified as: (1) Enterprise DWDM Optical Networks Carriers & System Companies (Edge Networks), (2) Metro Network Carriers & System Companies (Metro Core Networks), (3) Nation-Wide SONET/SDH Carriers & System Companies (Long-haul Core Networks), (4) Undersea/Ultra-long-haul Carriers & System Companies (Ultra-long-haul Core Networks). For all of these edge, metro, and long-haul network carriers and system companies, various and sophisticated optical components are utilized to provide longer distances, more channels per fiber, greater capacity per channel, small power consumption, small footprint, low cost, reliability, functional integration, and improved network management through channel monitoring, provisioning, and protection. The channels (i.e. wavelength length channels) of OTAN represent a group of optical signals at distinctive and pre-determined optical carrier frequencies (i.e. wavelengths), which are transmitted along optical fibers. While the time division multiplexing (TDM) technique maximizes the individual transmission speed of optical signals, the wavelength division multiplexing (WDM) technique, which can utilize either dense wavelength division multiplexing (DWDM) or coarse wavelength division multiplexing (CWDM) schemes, increases the number of optical signals (i.e. channels or wavelength channels) transmitted simultaneously on a single fiber.

Service-Level Agreement (SLA) is a contract between the end users and carriers covering a variety of metrics such as availability, bandwidth, time to provision/re-provision, speed of protection, and Quality-of-Service (QoS). Most of service providers of OTAN are required to sign SLA with customers of varying requirements and they are expected to guarantee the required QoS. OTAN operators are in need of comprehensive and efficient optical network traffic engineering & management capabilities. And OTAN carriers should monitor the optical traffics continuously and execute the SLA concurrently to thousands of customers with a known confidence. Therefore it is necessary that optical devices or modules for OTAN should be able to deliver fast, accurate, and dynamic services of channel monitoring, protection, provisioning, signal conditioning, (i.e. power equalization, gain control, dispersion &jitter control, and so on) or any combination thereof.

Multifunctional intelligent optical module (IOM) is a PLC-based optical component or module to enable efficient device integration, intelligent channel monitoring, and smart signal conditioning in order to address the aforementioned problems. The multifunctional IOM is an integration platform, which can combine photonic (i.e. optoelectronic), electronic, and micro mechanical elements to provide integrated optical functionalities within a single module platform, such as optical switching, variable optical attenuation, channel monitoring, optical input/output coupling, and WDM multiplex/demultiplex filtering. For example, the multifunctional IOM can provide an instantaneous and parallel monitoring of WDM wavelength channels to rapidly detect and isolate faults such as loss-of-fiber or loss-of-signal and to initiate alarm signaling and protection switching. The multifunctional IOM also can equalize DWDM wavelength channel powers and suppress unexpected channel signal ripples. It is possible to construct vertical optical switches and to enable a monolithically integrated optical add/drop multiplexer on the multifunctional IOM platform. The multifunctional IOM is useful to a variety of applications such as dynamic gain control of optical fiber amplifier modules (i.e. C and L-band Erbium gain modules and Raman modules), dynamic QoS control of individual WDM channel, temperature-stabilized ITU-grid wavelength filtering for cascaded OTAN networks, and dynamic DWDM network provisioning and protection switching. Some examples of multifunctional IOM-based devices and subsystems may include optical channel monitor (OCM), spectral optical channel monitor (S-OCM), dynamic channel controller (DCC), dynamic VOA multiplexer (DVM), smart optical switch (SOS), vertical optical switch (VOS), and smart optical add/drop multiplexer (S-OADM).

Some of the essential components for optical communication system are devices that can provide various functionalities such as signal branching, modulation, switching, filtering, amplification, attenuation, wavelength multiplexing/demultiplexing, wavelength switching, dispersion compensation, signal monitoring, optical signal generation/detection, and so on. Until recently majority of these functionalities are provided by manually packaging many discrete optical elements such as optical fibers, lenses, mirrors, prisms, thin-film filters, laser diodes, photodiodes and so on. These discrete optical elements have some inherent limitations on cost, size, speed, and large-scale integration. To overcome these limitations, many research groups around the world have pursued an extensive research on optoelectronic integration by utilizing planar lightwave circuit (PLC) or silicon optical bench (SOB). The PLC and SOB came from the planar geometry of optical waveguide circuits and the use of micromachined silicon chips to attach other electronic or photonic components. The PLC technology has already reached a level of development to produce a variety of commercial components that can compete or surpass the fiber-optic or bulk-optic counterparts. In particular, a silica-glass PLC, fabricated from glass compositions similar to that of optical fibers, has shown many impressive features such as low transmission losses, efficient interface to optical fibers, and a capability to integrate various devices (i.e. directional couplers, WDM filters, splitters, combiners, star couplers, arrayed waveguide grating multiplexer/demultiplexer filters, variable optical attenuators, interleavers, optical I/O couplers, and optical switches) on a single substrate. The multifunctional IOM platforms of the present invention utilize both PLC and SOB technologies to integrate PLC, MEMS actuators/microstructures, and electronic/photonic components on a single substrate and, in turn, it results in a mixed-technology microsystem. This mixed-technology microsystem can provide OTAN carriers with useful integrated optical devices and components with low cost, high performance, good reliability, small footprint size, and diverse functionalities.

The multifunctional IOM is an integrated and mixed-technology microsystem, which can provide a variety of optical operations such as optical channel monitoring, optical switching, optical channel control, DWDM multiplexing/demultiplexing filtering, and variable optical attenuation by integrating MEMS microstructures, MEMS actuators, electronic chips, and photonic chips within the PLC platform. Regarding optical switching operations, the normally passive PLC can actively perform optical signal switching by integrating MEMS actuators and integrated optical waveguides of PLC together. The combined MEMS actuators and integrated optical waveguides can provide vertical optical switches on PLC too. The vertical optical switch on the multifunctional IOM platform can also utilize a variety of MEMS actuation mechanisms including electrostatic, electromagnetic, thermal, impact, piezoelectric, or shape memory alloy actuators. It delivers many unique benefits such as scalability, low cost, small crosstalk, compactness, and wavelength/polarization insensitivity. Since the conventional macro-mechanical fiber optic switches require very complex assembly and alignment processes using many discrete optical components, it inevitably results in high costs, long production time, and non-uniform device performance. A large-scale array expansion of the macro-mechanical fiber switch is also difficult due to size requirements and device structures involving many discrete components. Since the multifunctional IOM utilizes the lithographically defined PLCs and MEMS microstructures/actuators, it is ideally suited for integrated and large-scale optical devices and components in an array. The present invention's unique device structure eliminates individual alignment of optical components on the multifunctional IOM platform regardless of number or location of optical components being involved, since the optical devices are defined and manufactured using lithographic manufacturing processes. In return, it allows the multifunctional IOM to be applicable to scalable and reconfigurable OTAN. The OTAN employs many different optical network elements like optical add/drop multiplexer (OADM), optical terminal multiplexer (OTM), optical crossconnect (OXC), and so on. Generally optical switches can dynamically add or drop communicating nodes within the OTAN as a network connectivity configuration changes. The number of active nodes in the OTAN can be dynamically increased or decreased depending on network traffic volume, fairness & priority of individual communicating nodes, or other conditions. OXC can switch or transmit optical signals directly between any input and output ports in both analog & digital formats and in a mixture of multiple data rates without electrical-to-optical or optical-to-electrical signal conversions. The multifunctional IOM is applicable to all of these optical network elements: OADM, OXC, and OTM.

Figure 1B:
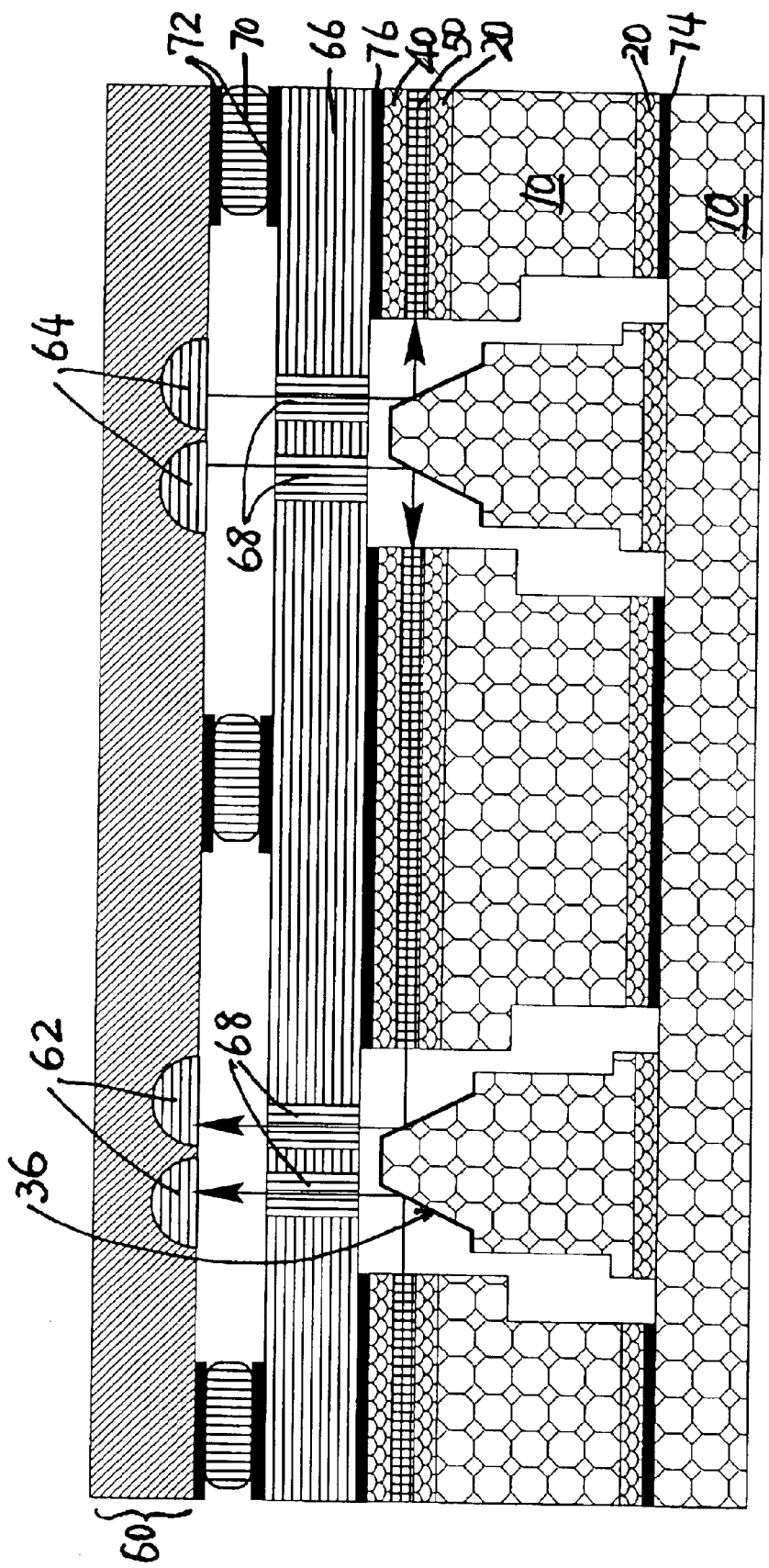

Referring now to the drawing, the FIG. 1 (comprising FIGS. 1A–1B) shows a side elevation view of multifunctional IOM platform with optical input/output (I/O) couplers, constructed according to the principles of present invention. In the multifunctional IOM platform as shown in FIG. 1 as well as in FIG. 10, the MEMS microstructures such as silicon mirrors 36, waveguide/silicon trenches 46, and MEMS actuators can provide optical I/O coupling and optical switching functionalities, while the PLC networks deliver high-speed and large-bandwidth optical interconnects. The combination of MEMS microstructures, micromachined PLC networks, and electronic/photonic chips 60 on a single substrate allows mixed-technology integration on the multifunctional IOM platform. In FIG. 1, both micromachined PLC and MEMS microstructures are separately fabricated and subsequently bonded together. Electronic or photonic chips 60 are later mounted on the micromachined PLC too. Detailed fabrication processes for micromachined PLC and MEMS microstructures are illustrated in FIG. 5 and FIG. 6. Note that the multifunctional IOM platform of FIG. 1 shows the silicon mirrors 36 with vertically etched sidewalls and it enables a high-density optical I/O coupler array by reducing the footprint size for silicon mirrors 36. It should be also noted that the silicon mirror 36 in FIG. 1 could be replaced with other type of micro mirror arrays. For example, an injection-molded mirror array structure can replace the silicon mirrors 36 if a similar or compatible structure as shown in FIG. 1 is provided. The injection-molded mirror array structure, made from a material like plastics or similar, can easily generate low cost and high quality micro mirrors and the mirror angle can easily be controlled to produce any angles. Like the silicon mirrors 36, the injection-molded mirror array structure can be coated with high reflectance materials 75 like dielectric or metal materials in order to improve the optical I/O coupling efficiencies. In FIG. 1A, the optical signals from waveguide cores 50 are reflected by the micro mirrors 36 and then are redirected toward the photo detectors 62. Similarly the optical signals from the light source 64 can be directed into the waveguide cores 50 by using micro mirrors 36. In FIG. 1B, a planar lens array 66 is further integrated with the multifunctional IOM platform. The optical signals from both waveguide cores 50 and light sources 64 are generally diverging along the optical paths. The diverging optical signals yield poor optical coupling efficiencies because the active areas for waveguide cores 50 and photo detectors 62 are relative small compared to the incoming optical beams. Therefore it is useful to utilize an optical lens 68, which can either collimate or focus the diverging optical beams toward the intended target such as waveguide cores 50 or photo detectors 62. Because of the unique device configuration of multifunctional IOM platform, it is necessary to utilize a planar lens array 66, which can be introduced along the optical paths. The planar lens array 66 is an array of optical lenses 68 fabricated within a single substrate. For example, but not limited, the gradient index lens (i.e. GRIN lens) can be manufactured in a planar lens array configuration. The optical lenses 68 can also be fabricated by constructing particular lens surface shapes. In this case the optical lenses 68 are typically composed of a material with constant refractive indices. It is also possible to construct the optical lenses 68 by utilizing diffractive optical elements such as gratings or holograms. Generally, the optical lenses are changing the direction of optical signal propagation by introducing material changes (like a refractive index change) or geometrical lens surface modification. The planar lens array 66 can increase the separation between waveguide cores 50 and light source 64 or photo detector 62. And it also facilitates an efficient optical I/O coupling. It is also feasible to implement the waveguide cores 50 at the bottom side of PLC substrate too, if the planar lens array 68 can focus the diverging optical beams efficiently. In FIGS. 1A and 1B, the electronic/photonic chips are mounted on the multifunctional IOM platform by using bonding pads 72 and solder bumps 70. The solder bumps 70 can be replaced with other types of electrically conducting pump materials including, but not limited to, gold, electrically conducting polymers, and so on. The micromachined PLC and MEMS structures are bonded together by using a bonding layer 74 too. This bonding layer 74 can provide a simple adhesion or electrically conductive pathways as necessary.

Generally the multifunctional IOM can be understood as one embodiment of Micro-Opto-Electro-Mechanical System (MOEMS). The MOEMS is an integrated and mixed-technology microsystem utilizing photonic, electronic, and micro mechanical technologies. The letter in the term "MOEMS" stands for "Micro" (micro-scale), "Optical" (like integrated optical waveguide networks and passive/active micro-optical components), "Electronic" (like integrated circuits and multilayer metal interconnects), "Mechanical" (like micromachined silicon sensors/actuators and passive alignment structures), and "Systems". It also represents that these components are integrated into a single microstructure by using IC compatible microfabrication and assembly technologies. Using the proposed MOEMS device structures (i.e. multifunctional IOM platform), very versatile optical devices, components, or subsystems can be fabricated and integrated using a lithographic batch process without presenting any of fabrication compatibility problems. The multifunctional IOM can provide known benefits of MEMS technology (such as miniaturization, multiplicity, and microelectronics), in addition to a seamless integration of electronic/photonic/micro-mechanical devices and components into a single package.

In MEMS technology, miniaturization allows structures of a few tens of micrometers to be fabricated with an accuracy in the sub-micrometer range, while multiplicity allows many structures be simultaneously fabricated by pre-assembly and batch processes. Micro-optoelectronics provides a way to fabricate and integrate optoelectronic & electronic devices and components by using the conventional IC-compatible micromachining technology. The resultant integration provides a smart microsystem having a variety of technologies (photonic, electronic and micro-mechanic). The current invention also fabricates integrated vertical optical switches in a batch mode using a well-established IC fabrication process, thereby improving performance and reliability, and reducing costs. In MEMS technology, MEMS sensors and actuators can lead to a completely different class of mechanical, fluid, thermal, optical, biological, and chemical device or component at the micro scale, which could deliver a previously impossible improvement on reliability, integration, performance, and cost. Multidisciplinary efforts on material search, device design, fabrication, and packaging of MEMS sensors and actuators are currently underway to provide the desired internal structure or functionality within the integrated microsystem platform. Some of the prominent subsystems for MEMS applications may include: physical (position, velocity, acceleration, and pressure), biological and chemical sensors; motors; valves and pumps; optical mirrors, modulators, scanners, and switches; mechanical actuators, levers, flexures, bearings, hinges, springs, and couplings; seals, interfaces, and packages and others. Currently there exist a variety of MEMS actuation methods such as electrostatic, electromagnetic, thermal, shape memory alloy (SMA), impact, and piezoelectric mechanisms and so on by utilizing a wide array of physical effects. Depending on the application, a suitable MEMS actuation mechanism can be selected and employed by carefully considering actuation range, power consumption, suitable range of electrical voltages and currents, temperature requirements, size constraints, process integration, device packaging, and so on.

In MEMS, bulk micromachining means that three-dimensional structures are etched into the bulk of crystalline or non-crystalline materials whereas surface micromachining represents the features built up layer-by-layer on the substrate surface. In bulk micromachining, bulk materials such as silicon, quartz, GaAs, InP, Ge, SiC, and glass are sculpted by orientation-dependant (anisotropic) and/or orientation-independent (isotropic) etch processes. In a typical surface micromachining, a dry etching defines the surface structures in x–y plane and a subsequent wet etching releases them from the plane by undercutting a sacrificial layer. In surface micromachining, a high vertical structure can be constructed by building large and flat structures horizontally and then rotate them on a hinge to an upright position as reported in polysilicon (poly-Si) hinges by Pister et al. A flat and long structural poly-Si features can be rotated out of the substrate plane and erected to create highly vertical microstructures such as hot wire anemometers, micro windmill, and micro-optical bench with mirrors, gratings, and micro-lenses. The hinged vertical mirror actuator can serve as a MEMS mirror actuator. The hinged vertical mirror actuator is beneficial when a large mirror surface is required. However the friction around the hinges and the need to erect and assemble hinged vertical mirrors makes the implementation of hinged vertical mirror actuator somewhat difficult too.

In general optical waveguides can be formed successfully by using both crystalline and non-crystalline materials. Optical waveguides formed using non-crystalline materials generally provide low propagation loss and economical fabrication, although crystalline materials, including semiconductors, are necessary for performing active functions such as optical signal generation, detection, and modulation. Crystalline optical waveguides are a part of semiconductor lasers and are used in semiconductor photonic integrated circuits. Another type of crystalline optical waveguide is made in lithium niobate by titanium diffusion, where they can build modulators, switching arrays, and polarization controllers. Silicon can also be used as optical waveguide material to construct PLCs. Among non-crystalline materials, silica glass is a choice of optical waveguide material for PLC by a large number of leading communication research groups. The silica glass waveguide has a stable and well-controlled refractive index with a very small propagation loss. It is highly transparent over a broad spectrum of optical wavelengths. Currently there exist several major ways of forming thick silica glass films for optical waveguides and these are flame hydrolysis deposition (FHD), plasma-enhanced chemical vapor deposition (PE-CVD), low-pressure chemical vapor deposition (LP-CVD), and electron beam deposition. All of these fabrication methods are using a reactive ion etching (RIE) to pattern a waveguide core. The patterned waveguide cores are generally buried within the layers of silica glass buffers. On the other hand, the polymer is another promising material for a low-cost PLC, though it suffers from problems related to long term stability, high-power handling capability, waveguide shrinkage, and so on. It should be noted that the PLCs for multifunctional IOM platform are not limited in utilizing a variety of optical waveguide materials including polymers or silicon so that it can take advantage of advancements and applicability of various waveguide material and material processing techniques. Note that the PLC platform can support either single-mode or multi-mode electromagnetic wave propagations along the waveguide networks.

FIG. 2 (comprising FIGS. 2A–2B) shows a diagrammatic view of unidirectional and bi-directional optical channel monitors, showing details of micromachined optical I/O couplers 48, optical pass-through waveguides 30, and signal-tap waveguides 32. The micromachined optical I/O couplers 48 direct optical signals from optical signal-tap waveguide 32 to optical detectors 62 through optical signal reflection on the surfaces of silicon mirrors 36. Optical detectors 62 can be positioned on top of the optical I/O couplers 48 such that reflected signals from the silicon mirror surfaces can be interfaced to light sensing areas of optical detectors 62. Again, it should be also noted that the silicon mirrors 36 could be replaced with other type of micro mirror arrays including the injection-molded mirror array. The PLC substrate is micromachined to form a trench 46 so that an array of micromachined silicon mirrors 36 can be inserted into the trench 46. A free-space gap between sidewalls of micromachined PLC trenches 46 and silicon mirror surfaces can be filled with air, gas, or index-matching fluid. For both unidirectional and bi-directional optical channel monitors as shown in FIG. 2A and FIG. 2B respectively, the optical signal-tap waveguides 32 sample a portion of optical signals by using signal branching waveguide structures 34. Directional coupler, Y-branch, or wavelength insensitive coupler can implement the signal branching waveguide structures 34. In the bi-directional optical channel monitor of FIG. 2B, two counter-propagating optical signals along two neighboring waveguides 30, 37 are branched into two signal-tap waveguides 32 to interface with a single optical I/O coupler 48. The optical signal couplers in FIG. 2B can handle two optical signals out of two distinctive signal-tap waveguides 32 simultaneously and in parallel by using two distinctive mirror surfaces. For both unidirectional and bi-directional optical channel monitors, optical pass-through waveguides 30 transfer a major portion of optical powers without altering signal state nor interrupting signal transfer characteristics of passing-through optical signals, while a small portion of optical powers from the same optical pass-through waveguides 30 are sampled and monitored by using signal branching structures 34, optical signal-tap waveguides 32, micromachined optical I/O couplers 48, and optical detectors 62.

FIG. 3 (comprising FIGS. 3A–3B) shows a diagrammatic view of unidirectional and bi-directional configurations of spectral optical channel monitors, showing details of vertical filter plates 35 inserted into two-sided trenches, micromachined optical I/O couplers 48, optical pass-through waveguides 30, and signal-tap waveguides 32. Compared to previous optical channel monitors shown in FIG. 2, the spectral optical channel monitors incorporate a narrow two-sided trench intersecting both optical pass-through waveguide 30 and optical signal-tap waveguide 32 at tilted angles. In FIG. 3, the two-sided trench is filled with the vertical filter plate 35, so its structure is not shown in detail. The vertical filter plate 35, inserted into the narrow two-sided trench, can be permanently fixed by bonding materials with a reflective index closely matched to the core 50 of light-transmitting waveguide. The vertical filter plate 50 could be a wavelength selective device by selectively transmitting optical signals within the passband of optical wavelength spectrum, while selectively reflecting optical signals outside of the passband of optical wavelength spectrum. The reflected optical signals from optical pass-through waveguides 30 and optical signal-tap waveguides 32 are coupled into third waveguide 31 and fourth waveguide 33 respectively, which are in turn coupled out of the PLC by another optical I/O couplers 48. In FIGS. 3A and 3B, a large optical I/O coupler 48 with wider silicon mirror surfaces and trench sidewalls are interfacing with third and fourth waveguides 31, 33. The large optical I/O coupler 48 can utilize separate optical I/O couplers with narrower silicon mirror surfaces or trench sidewalls in order to interface with third and fourth waveguides 31, 33 individually. The vertical filter plate 35 for spectral optical channel monitoring could also filter out optical noises outside the passing bands. And these filtered optical noise signals are reflected and coupled to the third and fourth waveguides 31, 33. Therefore optical signals coupled out of third and fourth waveguides 31, 33 can indicate the spectral integrity of optical signals, which propagates along the pass-through waveguides 30.

FIG. 4 (comprising FIGS. 4A–4B) is a detailed diagrammatic view of optical I/O couplers for multifunctional IOM platform, showing the tapered cores 53 and tilted cores 49 of signal-tap waveguides 32 terminated at micromachined trenches 46. In FIG. 4A, the cores 50 of optical signal-tap waveguides 32 are tapered to wider cores prior to interfacing with vertical sidewalls at waveguide-to-trench interfaces. Here the waveguide tapers 53 can be either symmetric or asymmetric. In FIG. 4B, the termination interface between cores of optical signal-tap waveguides and micromachined trench is tilted from a usual 90-degree angle as shown in FIG. 4A. The tilted waveguide termination at the optical I/O coupler can reduce the back-reflections from the waveguide-to-trench interfaces.

FIG. 5 (comprising FIGS. 5A–5F) is a diagrammatic view of micromachined planar lightwave circuit at various stages of fabrication. The PLC network consists of layers of micromachined waveguide layers, where waveguide core 50 is buried between upper and under cladding layers 40. Here, various fabrication stages for the micromachined planar lightwave circuit by using silica glass waveguide is described in the following, but the PLCs utilizing other type of waveguide materials can also be fabricated in a similar way.

Figure 5A:
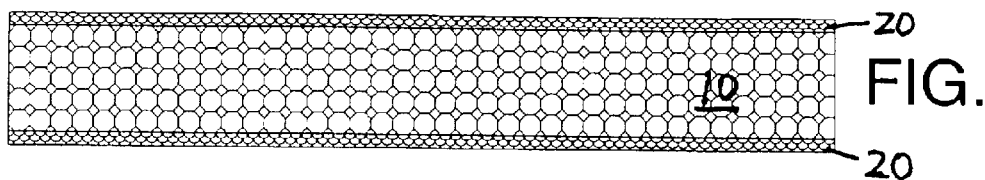
FIG. 5 (comprising FIGS. 5A–5F) is a diagrammatic view of micromachined planar lightwave circuit at various stages of fabrication.

In FIG. 5A, a silicon wafer 10 is thermally oxidized to form a thin silicon dioxide layer 20 on both sides of wafer.

Figure 5B:
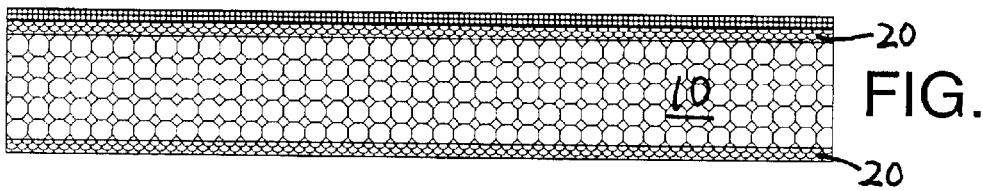

In FIG. 5B, an under cladding silica glass layer 40 is deposited on top of the silicon dioxide layer to provide a sufficiently thick under-cladding for waveguide formation.

Figure 5C:
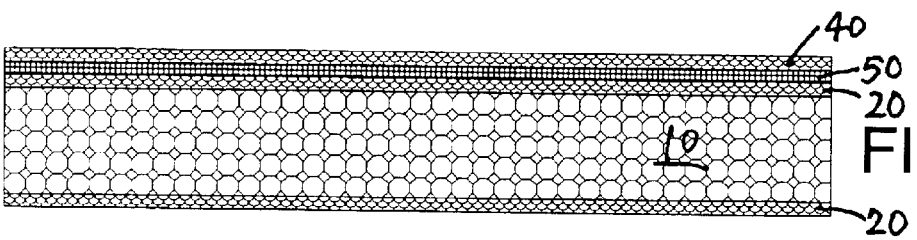

In FIG. 5C, a silica glass core layer 50 with a slightly higher refractive index than the cladding layer material is deposited on top of the under cladding layer 40. Then the deposited silica glass layers 40, 50 can be annealed at high temperature for consolidation. Subsequent photolithography and reactive ion etching (RIE) processes can pattern the waveguide core layer 50. Then upper cladding silica glass layer 40 is deposited on top of the patterned waveguide core 50. Subsequently the final structure can be consolidated again by annealing at high temperature.

Figure 5D:
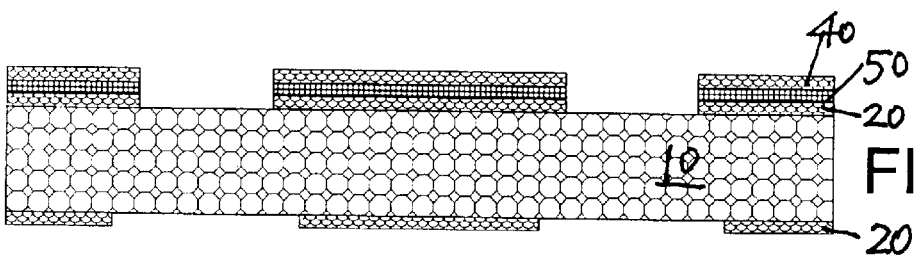

In FIG. 5D, a portion of material for silica glass waveguide layers is etched away by RIE processes to form a micromachined trench on the waveguide layer. A portion of silicon dioxide layer on the back of PLC wafer is also etched away.

Figure 5E:
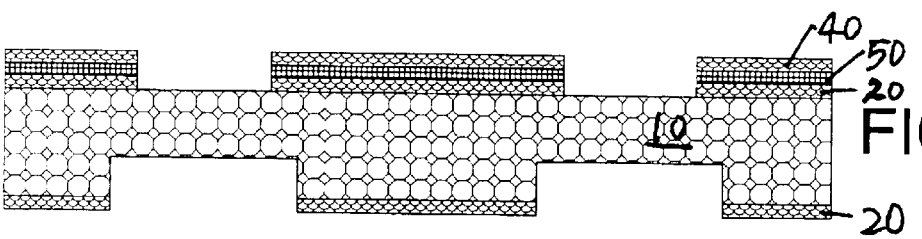

In FIG. 5E, a portion of silicon on backside of PLC wafer is etched away vertically by RIE processes.

Figure 5F:
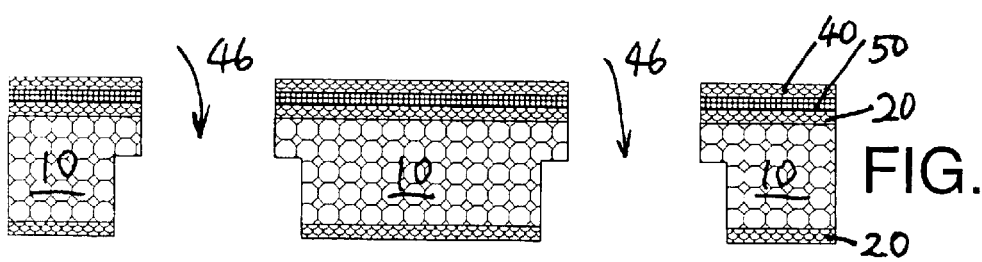

In FIG. 5F, a portion of silicon underneath micromachined trench on the waveguide layer is etched vertically by RIE processes to form a micromachined through-holes in order to allow micromachined silicon mirrors to be inserted.

Aside from the fabrication procedures described in the FIG. 5, the micromachined PLC can also be fabricated by using a silicon-on-insulator (SOI) structure, since the optical waveguide layers can be deposited on the SOI wafers and subsequently micromachined. The thin silicon layer on SOI wafer can be sculptured into the MEMS structures and the sculptured MEMS structures with optical waveguide layers can be combined with micromachined silicon mirror arrays too.

FIG. 6 (comprising FIGS. 6A–6F) is a diagrammatic view of silicon mirror array with a small footprint size at various stages of fabrication.

Figure 6A:
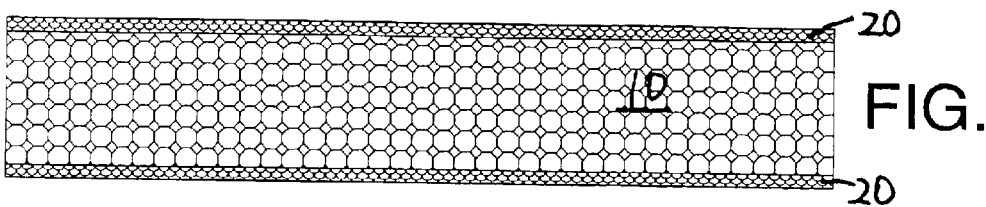
FIG. 6 (comprising FIGS. 6A–6F) is a diagrammatic view of silicon mirror array with small footprint size at various stages of fabrication.

In FIG. 6A, a silicon wafer 10 is thermally oxidized to form a thin silicon dioxide layer 20 on both sides of wafer.

Figure 6B:
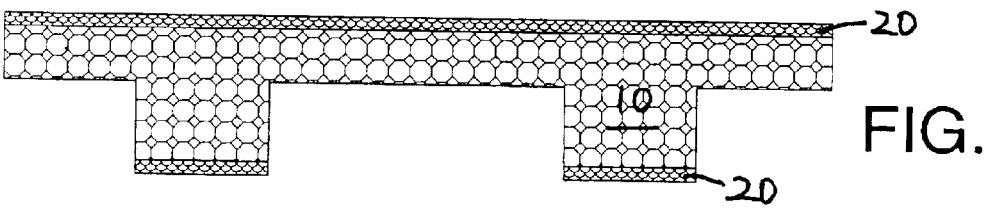

In FIG. 6B, a portion of silicon substrate 10 is etched away from a backside of silicon wafer.

Figure 6C:
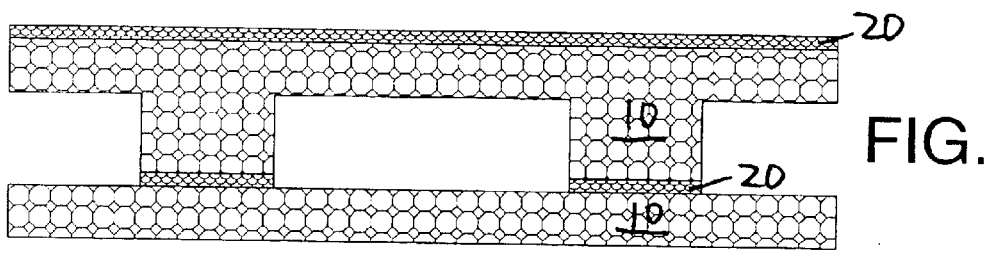

In FIG. 6C, the micromachined silicon substrate prepared as shown in FIG. 6B is bonded with another silicon substrate 10.

Figure 6D:
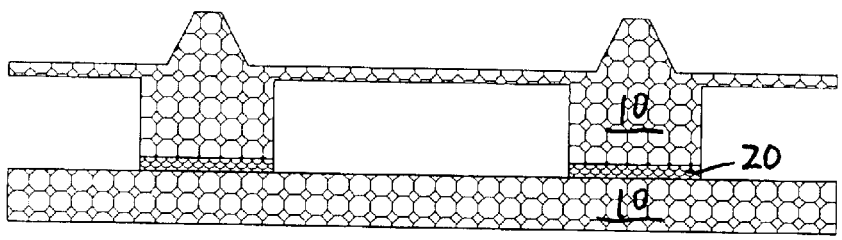

In FIG. 6D, a silicon dioxide layer 20 on a front side of micromachined silicon wafer is patterned. Then a portion of silicon on the front side of micromachined silicon wafer is wet etched to form an array of silicon mirrors.

Figure 6E:
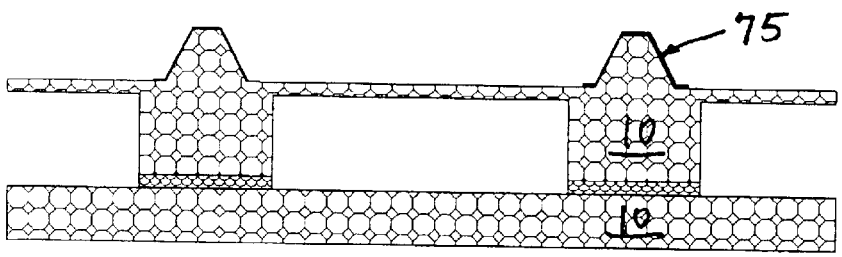

In FIG. 6E, the front side with silicon mirror array is selectively coated with reflective layer 75. Using shadow mask, which is a thin mask plate with through-hole patterns in order to define the area to be coated with reflective material, can perform a selective patterned coating. The reflective layer can also be first deposited on top of the entire silicon mirror array wafer. Then it can be patterned and etched away to leave the reflective coating on top of the silicon mirror arrays only.

Figure 6F:
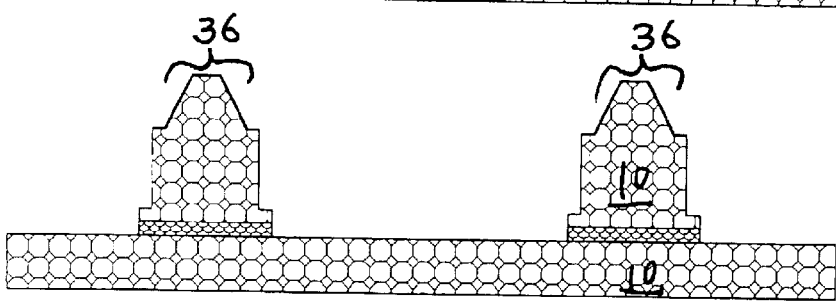

In FIG. 6F, a portion of silicon not covered by metal layer as shown in FIG. 6E is etched away to produce an array of silicon mirrors 36 with vertical sidewalls. Vertical sidewalls of silicon mirrors as shown in the FIG. 6F make the silicon mirror footprint be smaller than the conventional pyramid-shape silicon mirrors.

The micromachined PLC and MEMS microstructures with silicon mirror arrays in FIG. 5F and FIG. 6F can be aligned and bonded with each other. Finally, a subsequent bonding of electronic/photonic chips 60 on the micromachined PLC can result in the multifunctional IOM platform as shown in FIG. 1.

Figure 7:
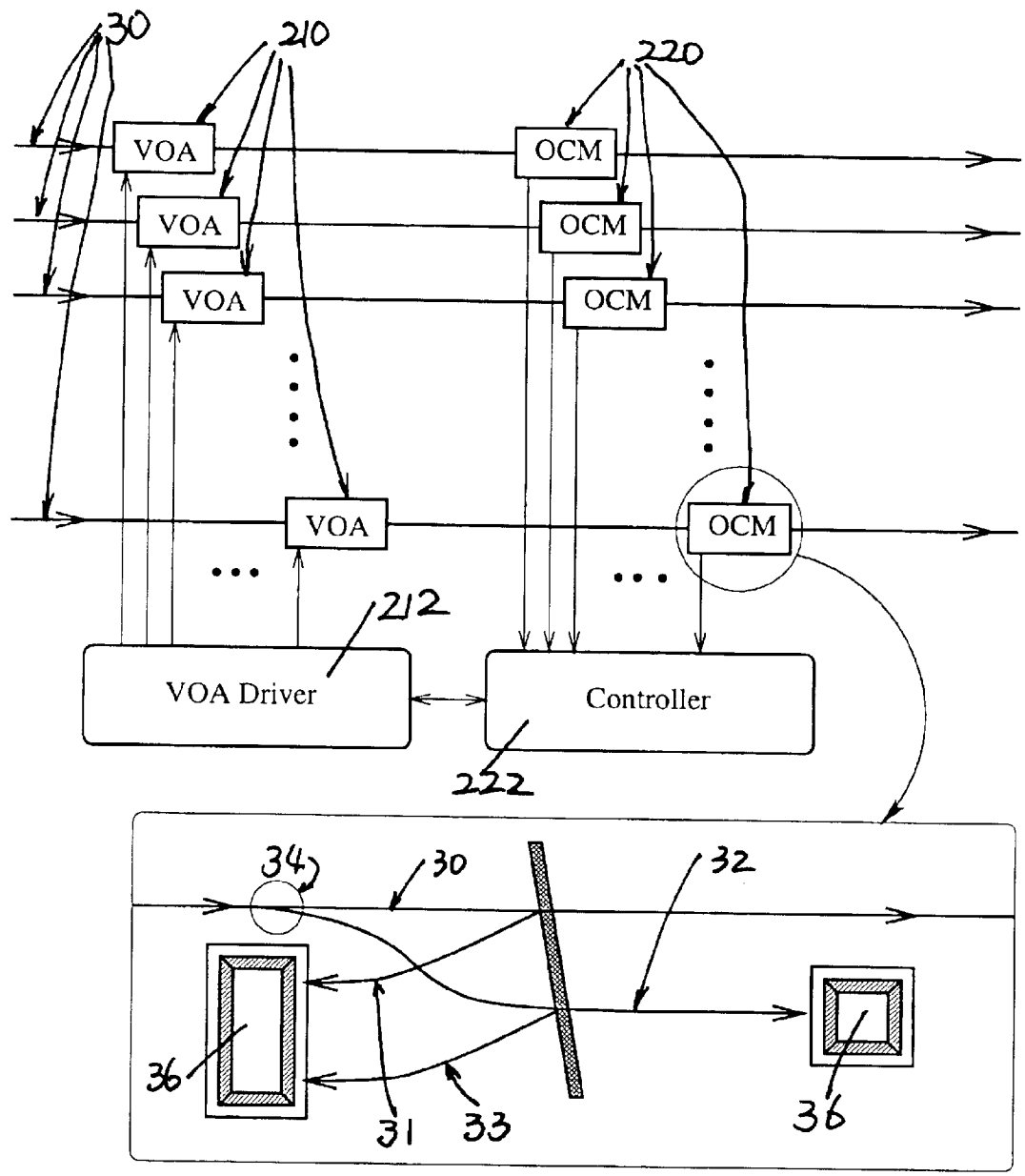
FIG. 7 is a diagrammatic view of dynamic channel controller composed of arrays of VOAs and optical channel monitors on the multifunctional IOM platform.
Figure 8:
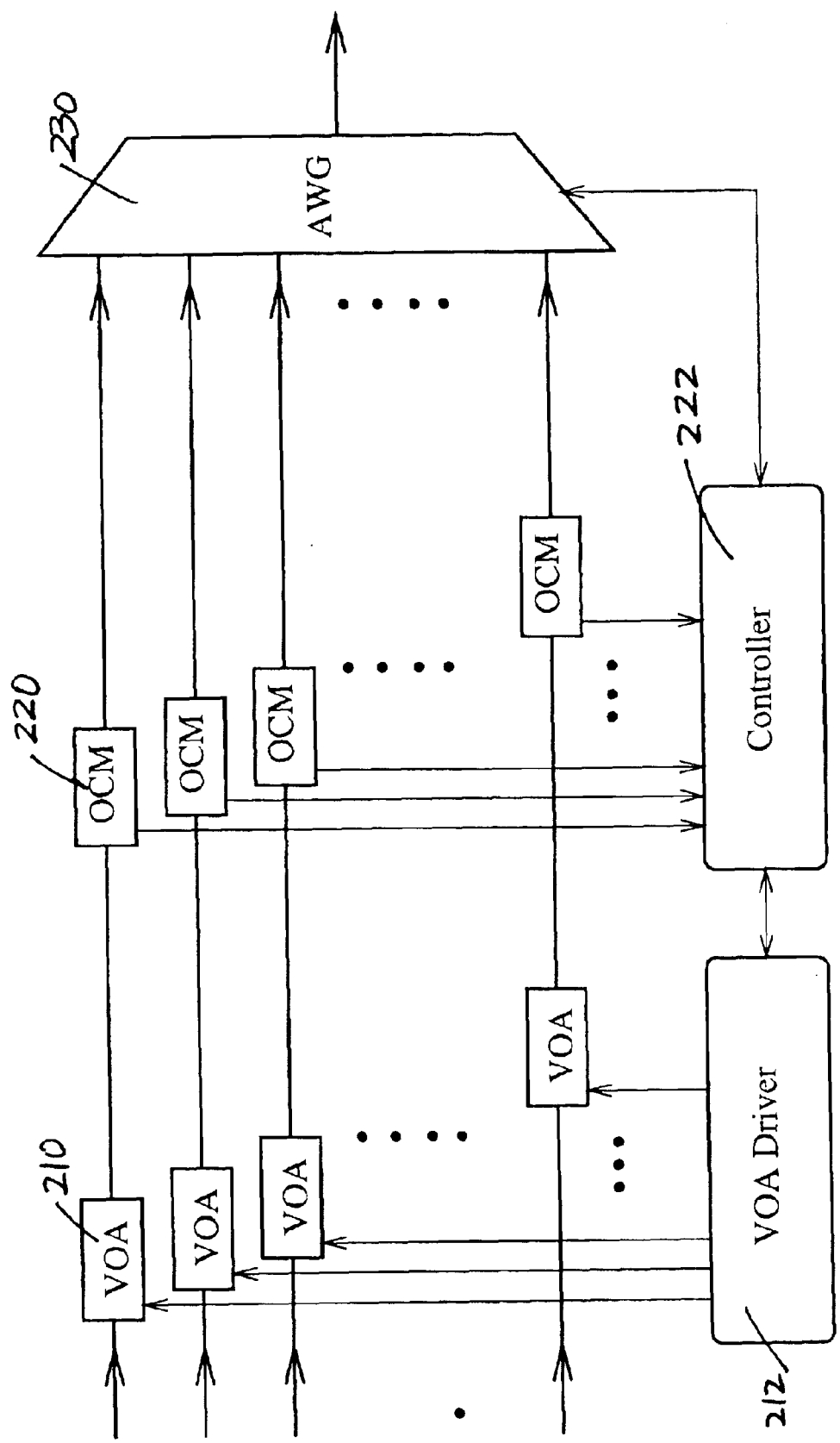
FIG. 8 is a diagrammatic view of dynamic VOA multiplexer composed of optical channel monitors, VOAs, and arrayed waveguide grating multiplexer filter on the multifunctional IOM platform.

FIG. 7 is a diagrammatic view of dynamic channel controller (DCC) composed of VOAs and optical channel monitors (OCMs) in an array configuration by using the multifunctional IOM platform. DCC is an intelligent optical subsystem capable of dynamically and independently controlling power levels of individual optical signals. It consists of two distinctive optical stages: VOA 210 and OCM 220 stages. The OCM stage can monitor the incoming optical signals on the pass-through waveguides 30. The OCM stage can utilize either regular optical channel monitor of FIG. 2 or spectral optical channel monitor of FIG. 3. The controller 222 collects the optical channel power information and provides an appropriate control signals to VOA driver 212 to adjust the optical signal power. Depending on applications, individual power level of optical signals along pass-through waveguides 30 can be equalized or set to any specific values too. Even though the FIG. 7 shows the OCM 220 stage right after the VOA 210 stage, it is also possible to construct a similar DCC with a different configuration by reversing the OCM 220 and VOA 210 stages. FIG. 8 is a diagrammatic view of dynamic VOA multiplexer (DVM) composed of optical channel monitors (OCM) 220, VOAs 210, and arrayed waveguide grating (AWG) filter 230 on the multifunctional IOM platform. DVM is another intelligent optical subsystem with an arrayed waveguide grating (AWG) 230 stage integrated with the DCC of FIG. 7. In comparison with the DCC of FIG. 7, the number of output ports on DVM as shown in FIG. 8 becomes just one due to the optical channel multiplexing by using AWG multiplexer 230. In DVM, the active monitoring and controlling of individual optical channels through VOA 210 and OCM 220 stages can compensate the channel-dependent AWG insertion losses. Again, the DVM can be constructed with a different configuration by reversing the VOA 210 and OCM 220 stages. It is also feasible to construct another variation of DVM by reversing the optical signal propagation direction in order to construct a dynamic VOA demultiplexer. The VOA 210 and AWG filter 230 can be a bi-directional optical device. For the AWG filter 230, the reversal of optical signal propagation transforms a multiplexer filter into a demultiplexer filter. It is shown in FIG. 2B and FIG. 3B that both regular and spectral OCM 220 can be easily modified to enable optical signal propagations in a reverse direction.

Figure 9:
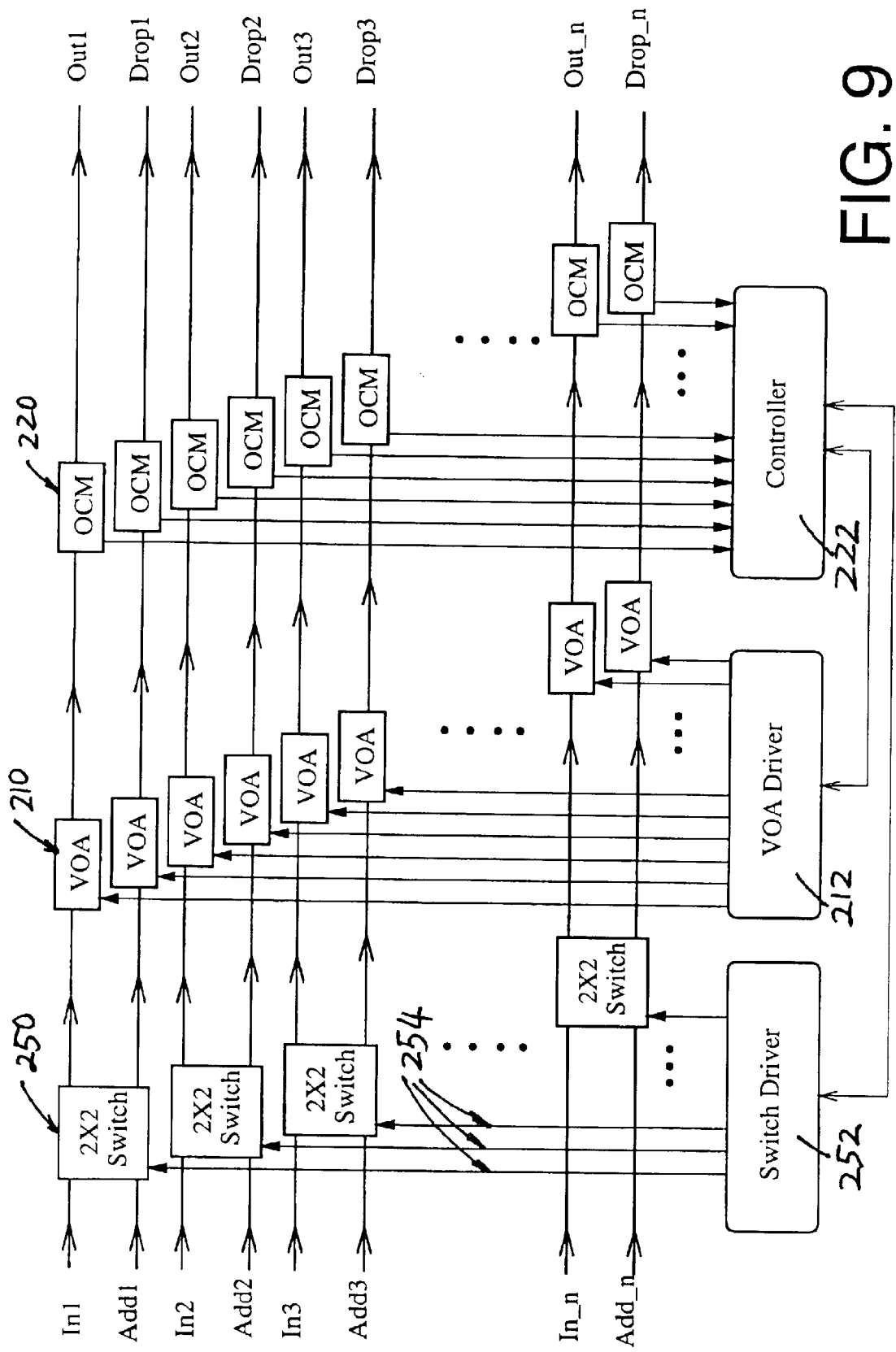
FIG. 9 is a diagrammatic view of smart optical switch composed of optical channel monitors, VOAs, and optical switches on the multifunctional IOM platform.

FIG. 9 is a diagrammatic view of smart optical switch (SOS) composed of optical channel monitors 220, VOAs 210, and optical switches 250 on the multifunctional IOM platform. SOS is an intelligent optical subsystem for dynamic optical signal add/drop switching by integrating 2×2 optical switches 250 and DCC of FIG. 7. The use of VOA 210 and OCM 220 stages on SOS also enables accurate optical channel monitoring and precise optical power level control in real-time. The stages of 2×2 optical switches 250, VOA 210, and OCM 220 can be interchanged with each other to construct other possible configurations of SOS.

In the above examples of DCC, DVM, and SOS, the integration of diverse optical stages 210, 220, 230, 240 on the multifunctional IOM platform reduces overall device sizes, insertion losses, and costs, while improving reliability of IOM. Without aforementioned integrations, all of the discrete VOA 210, OCM 220, optical switches 250, and AWG filter 230 devices need to interface with each other by using many fiber-to-waveguide and waveguide-to-fiber interfaces. The repeated waveguide-to-fiber or fiber-to-waveguide interfaces introduce additional costs and insertion losses with uncertain variations. It is known that PLC chips can interface with each other by utilizing a direct waveguide-to-waveguide bonding. However, the direct waveguide-to-waveguide bonding requires the end facets of PLC to be cleaved and polished first. The PLC end facet normally incorporates a planar glass or silicon cover in order to protect the PLC waveguide layers from peeling and to increase an effective bonding area for the direct waveguide-to-waveguide bonding. Further it is well known that PLC end facet or fiber end fact should be polished in an angle in order to reduce back-reflection effects. Therefore the multifunctional IOM platform can provide many attractive advantages by providing a monolithic integration of diverse optical stages. The above examples of DCC, DVM, and SOS can be implemented by using direct waveguide-to-waveguide bondings, as another embodiment of the present invention, to eliminate many waveguide-to-fiber and fiber-to-waveguide interfaces. As the number of optical channels increases, the fiber management can become a major manufacturing bottleneck, since hundreds of fragile and discrete optical components may deteriorate overall reliability of complex optical components and subsystems. The integration of multiple optical stages on the multifunctional IOM platform or direct waveguide-to-waveguide bonding can eliminate fiber splicing points and fiber connectors too. The 2×2 optical switches 250 for the multifunctional IOM platform can utilize a variety of PLC-based optical switches, including thermo-optic switches, micro-mechanical optical switches, total internal reflection switches using micro bubbles or liquid flows, and the other types of optical switches. The VOA 210 can also utilize a variety of PLC-based variable attenuation devices too. It could be thermo-optic, micro-mechanical, or electro-absorption type devices. The AWG filters 230 can be constructed on the PLC platform by using a variety of materials such as silica glass, polymer, or silicon.

Figure 10D:
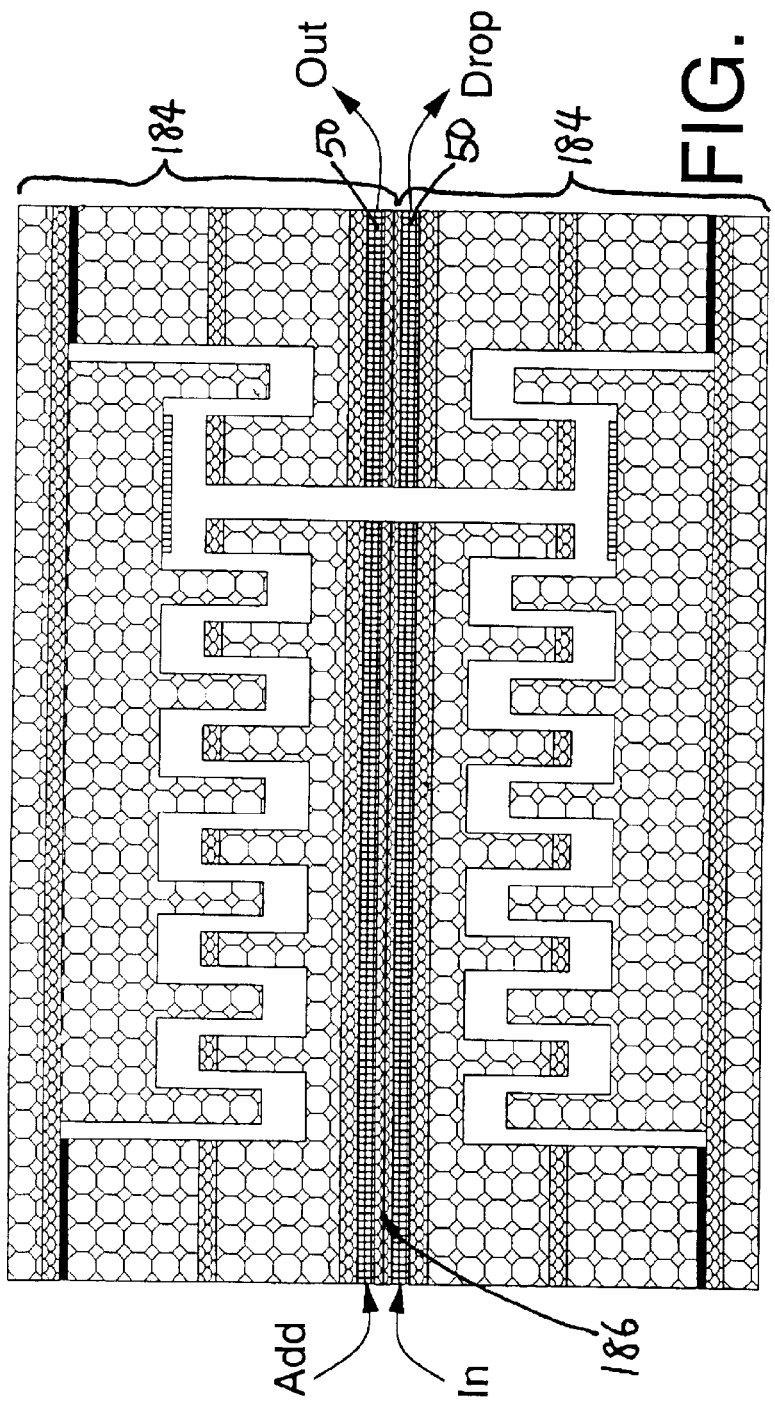
FIG. 10 (comprising FIGS. 10A–10F) is cut-away side elevation views of vertical optical switch on the multifunctional IOM platform and its functional schematic diagrams illustrating that optical signals can be switched vertically among cores on different layers of multilayer planar lightwave circuits through a movement of cantilever flexure containing optical waveguides.

FIG. 10 (comprising FIGS. 10A–10F) is a cut-away side elevation view of a vertical optical switch and corresponding functional diagrams illustrating that, through a movement of cantilever flexure containing optical waveguides, optical signal can be routed vertically among cores positioned at different layers of multilayer integrated optical waveguides. PLC core 50 for sender waveguide port 80 of vertical optical switch is integrated on a moving cantilever flexure 180 of MEMS actuator. The PLC core 50 can move upward and adjust its position relative to a fixed receiver waveguide ports' 90 cores 50. FIG. 10A illustrates the MEMS actuator utilizing vertically positioned and electrostatically driven side actuator (i.e. comb driver). The comb driver is composed of moving comb 170 with moving comb fingers 150 and stationary comb 160 with stationary comb fingers 140. The electrostatic forces between moving comb fingers 150 and stationary comb fingers 140 provide a swing motion to the moving cantilever flexure 180 to enable add-drop state or pass-through state as shown in FIG. 10B and FIG. 10C respectively. An external electric control signals can supply the electrostatic potential to displace the moving cantilever flexure 180 of vertical optical switch. Note that the moving comb fingers 150 and stationary comb finger 140 need not to be implemented along the entire portion of the moving cantilever flexure port 180. The moving cantilever flexure port 180 may utilize the comb driver implemented around the freely moving end of cantilever structure. In the add-drop state as shown in FIG. 10B, Add port and In port are interfaced with Out port and Drop port respectively. In the pass-through state as shown in FIG. 10C, In port is interfaced with Out port. Here Add and Drop ports are disconnected and not interfaced with each other. If it is necessary to interface Add and Drop ports for the pass-through state, a third waveguide layer can be utilized to provide a feedback loop between Add and Drop ports.

Comb driver, also known as electrostatically driven side actuator, is a simple and ingenious actuator, where one comb 170 is free to move while the other 160 is stationary as shown in FIG. 10A. The comb driver can be implemented into a variety of configurations such as unidirectional, bi-directional, linear, or rotary comb actuators. Both the moving and stationary combs 170, 160 are interfaced with a substrate 18 supporting both combs as an integrated structure. When electrical control signals are applied to the stationary combs 160, the moving comb 170 moves either toward or away from the stationary comb 160 due to the electrostatic potential accumulated between the combs 170, 160. In FIG. 10A, the moving comb 170 becomes a movable cantilever flexure 180 with the comb fingers 150 placed on a bottom. Micro-mechanical characteristics of vertical optical switches are determined by geometrical configuration of combs 140, 150, moving cantilever flexure's spring constant, and electrical control signals. In the case of comb driver as shown in FIG. 10A, the electrostatic force caused by voltage across the moving and stationary combs 170, 160 can control the position of moving cantilever flexure 180 wherein the sender waveguide port 80 is integrated. The comb driver is a well-known MEMS component and the mathematical models for comb driver's spring constant, resonant frequency, and displacement are well studied and extensively published in the leading MEMS journals.

Cantilevered beam suspension can provide a spring motion for the moving comb 170. The mechanical properties of materials determine the deflection of cantilever beams and the first-order model for cantilever beam deflection will be described in the following. Every solid material exhibits some sort of stress after it is formed into a certain shape. The stress a is a force per unit area and it can be either tensile or compressive stresses. Consider a linear bar under a stress by either pushing or pulling both ends of the bar. Let's assume that the force is uniformly distributed over the cross section of the bar. The stress on the bar induces an elongation of the bar and the ratio of elongation to the original length of bar is known as strain ϵ. A linearly elastic bar follows the Hook's law by exhibiting that the strain ϵ is linearly proportional to the stress σ on the bar as shown in the formula below:

$$\sigma = E\epsilon$$

The linear constant E relating stress σ and strain ϵ in the Hook's law is known as modulus of elasticity or Young's modulus and its value depends on the material characteristics of the linearly elastic bar. For the cantilever suspension beam used in the comb driver, it is important to determine the deflection v(L) and angle of rotation θ at the free-end of the beam. The force behind the deflection of movable cantilever flexure can be an electrostatic potential accumulated between the stationary and moving combs 160, 170. Based on the theory of electrostatics the electrostatic force can be calculated as follows:

$$F = \frac{n \cdot \varepsilon_0 \cdot H \cdot V^2}{g}$$

Here n, $\varepsilon_0$, H, V, and g are the number of combs, dielectric permitivity of the material among comb fingers, comb height, applied voltage, and the gap between combs respectively. Assuming that the force is uniformly distributed along the side of cantilever beam flexure, the deflection v(L) and angle of rotation θ at the free-end can be expressed as:

$$v(L) = \frac{F \cdot BL}{8 \cdot E \cdot I} = \frac{3 \cdot n \cdot \varepsilon_0 \cdot V^2 \cdot BL^3}{2 \cdot g \cdot E \cdot BW^3}$$

$$\theta = \frac{F \cdot BL^2}{6 \cdot E \cdot I} = \frac{2 \cdot n \cdot \varepsilon_0 \cdot V^2 \cdot BL^2}{g \cdot E \cdot BW^3}$$

Here F, BL, E, and I are the force, beam length, Young's modulus, and moment inertia of the moving cantilever flexure 170 respectively. By substituting F and I with the appropriate formulas, the final expressions are obtained in the above formulas. The moment of inertia of the moving cantilever flexure with a cross-section of rectangular shape is given by:

$$I = \frac{BH \cdot BW^3}{12}$$

In the final expressions for the deflection v(L) and angle of rotation θ at the free-end, the notations of BW, n, $\varepsilon_0$, H, V, and g represent the beam width of moving cantilever flexure 170, number of combs, dielectric permitivity of materials between combs, comb height, applied voltage, and gap among comb fingers respectively. Note that BH (beam height of the moving cantilever flexure 170) is same as H (comb height) and these are cancelled with each other in the final expressions. The first-order model for cantilever beams provides some insights on the vertical optical switch design parameters and their inter-relationship. To understand the feasibility of vertical optical switch, the following design parameters can be considered as a vertical optical switch example: E=175 GPa for single crystal silicon, BL=12,000 μm, BW=50 μm, H=100 μm, FW (comb finger width)=20 μm, g (comb finger gap)=10 μm, V=30 V, and $\varepsilon_0$=8.854×1OE-14 F/cm. If these design parameters are applied to the first-order model for cantilever beams, the deflection v(L) and angle of rotation θ at the free-end become 18.88 μm and 0.12 degrees. If we assume a receiver waveguide port 90 with core width 52 of 8 μm and waveguide channel separation 58 of 8 μm, the optical switch with 1-input/3-output configuration utilizing the vertical actuation structure requires a deflection about 16 μm for the moving cantilever flexure 170. The moving cantilever flexure 170 of this example can provide a sufficient amount of movement for the sender waveguide port 80 to implement the optical switch with 1-input/3-output configuration.

The comb microstructures of vertical optical switch can be fabricated in a variety of ways, but one of the promising silicon etching method is a deep silicon reactive ion etch (RIE) by the Bosch process utilizing inductively coupled plasma (ICP) reactors. The ICP reactor provides low pressure (1 to 100 mTorr), high degree of ionization (2 to 10%), high aspect ratio etching, and high rate of material removal by ion impact. The ICP silicon etching process can fabricate a variety of silicon microstructures with trench aspect ratio up to 50:1, beam aspect ratio up to 90:1, and etch depth covering from less than 2 micrometers to larger than 500 micrometers. Currently this process provides the silicon etch rate up to 12 micrometer/minute, Si:Resist mask selectivity up to 250:1, Si:Oxide mask selectivity up to 1000:1, etch uniformity less than +/−5%, and controllable profile angle of 90+/−1 degrees with a room-temperature process environment. As suggested in the formulas for deflection v(L) and angle of rotation θ at the free end of the beam, it is highly beneficial to fabricate comb microstructures with long finger length, fine finger pitch, and small finger gap. Currently the silica-glass micromachining technique exhibits many limitations on minimum feature size, etch rate, and etch depth of the microstructures compared to the silicon micromachining techniques.

In guided wave optical switch technology, three classes of switching mechanisms can be identified for the moving optical fiber switches and these are 1) fiber-to-fiber switching, 2) fiber-to-waveguide switching, and 3) waveguide-to-waveguide switching. First, the fiber-to-fiber optical switching is a simple and direct optical switching mechanism with low insertion losses. But the actuation for this type of optical switch mechanism requires a large amount of actuator displacement. In addition this mechanism demands the discrete optical components to be aligned and packaged individually to result in a high cost. Secondly the fiber-to-waveguide optical switching is a hybrid method by employing optical fibers and integrated optic waveguides at both ends of the receiver/sender ports. The inherent advantage of this mechanism is a reduction on the amount of actuator's movement, since the integrated optical waveguides at the receiver/sender ports are spaced closer than the optical fibers for fiber-to-fiber switching. It is not necessary to align and package multiple optical fibers at the receiver/sender ports. But this mechanism requires fiber-to-waveguide couplers to interface optical signals. In third the waveguide-to-waveguide optical switching is a fully integrated switching mechanism. It allows a cascaded switch array on a single substrate to realize a large-scale integration of switches. The optical switching time is small, as it requires relatively a small amount of actuator movement, and the integrated nature of this mechanism makes the alignment & packaging of discrete optical components unnecessary. But it requires fiber-to-waveguide couplers or waveguide-to-fiber couplers to interface signals from or to optical fibers and it could exhibit relatively large amounts of optical switch insertion losses. The vertical optical switch is essentially a moving waveguide switch utilizing the waveguide-to-waveguide optical switching mechanism by the aid of MEMS actuator. The vertical optical switch employing the waveguide-to-waveguide switching scheme requires a small amount of waveguide movement, since the PLC cores 50 are spaced closer than the fiber cores used in the moving fiber-to-fiber switches. Optical fiber diameters for the telecommunication systems are typically 125 micrometers for both single and multimode fibers, which results in a minimum fiber separation of 125 micrometers for the fiber-to-fiber switching. For example but not limited to, the typical PLC channel separations 58 on the waveguide-to-waveguide switching, ranges from 5 μm to 20 μm and it allows the optical channel density for the fiber-to-waveguide or waveguide-to-waveguide switches one order higher than that of moving fiber-to-fiber switches. Furthermore the photolithographic fabrication processes prearrange the relative positions of sender port 80 and receiver port 90 of vertical optical switch to eliminate the alignment and packaging processes of discrete optical components used in the moving fiber-to-fiber switches. The fully integrated nature of vertical optical switch using the lithographic PLC fabrication processes results in a small amount of height differentials and gap width 56 between the sender and receiver ports 80, 90 to assure a consistent and reliable vertical optical switch operation.

FIG. 10D is a cut-away side elevation view of other embodiment for vertical optical switch illustrating that, through a movement of cantilever flexure containing optical waveguides, optical signal can be routed vertically among cores positioned at different layers of multilayer integrated optical waveguides. In FIG. 10D, the vertical optical switch utilizes a device structure similar to that of FIG. 10A. In FIG. 10A, the vertical optical switch employees the vertically stacked cores 50 of PLC with a micro actuator. But, the vertical optical switch as shown in FIG. 10D utilizes two identical devices 184 stacked together, wherein the identical device 184 employees a single core PLC with a micro actuator. By joining the PLC waveguide layers together through a bonding layer 186, it is possible to switch optical signal vertically between the cores of stacked PLCs. The functional block diagrams of FIG. 10E and FIG. 10F are identical to FIG. 10B and FIG. 10C respectively. The advantage of the vertical optical switch shown in FIG. 10D is that stresses of the moving cantilever flexure 180 can be compensated with each other by utilizing the identical and symmetric device structure.

Figure 11A:
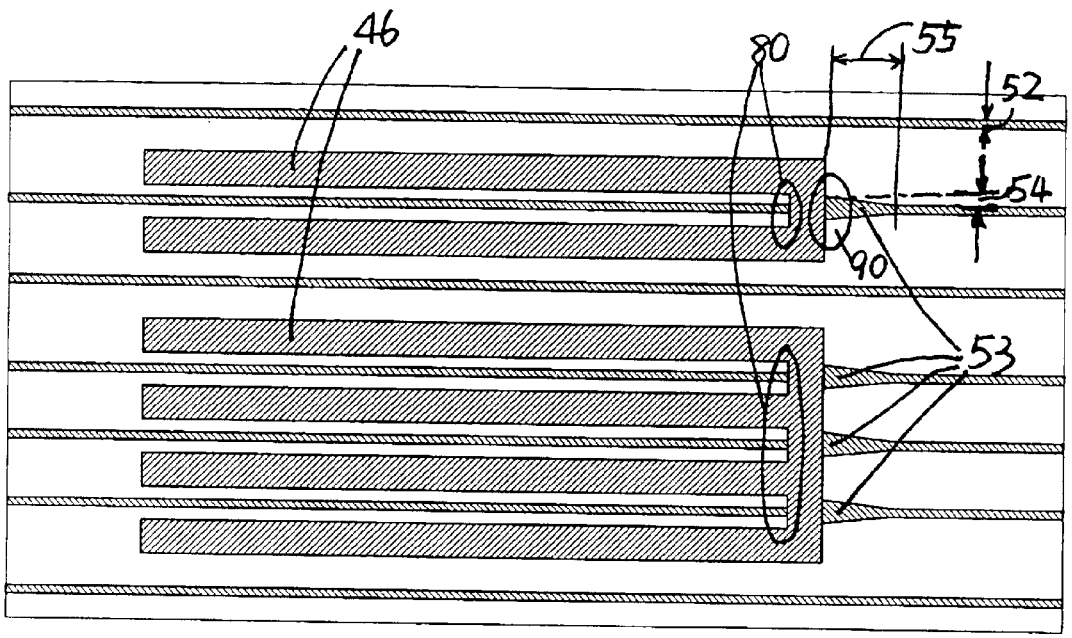
FIG. 11 (comprising FIGS. 11A–11B) is a diagrammatic view of vertical optical switch array.
Figure 11B:
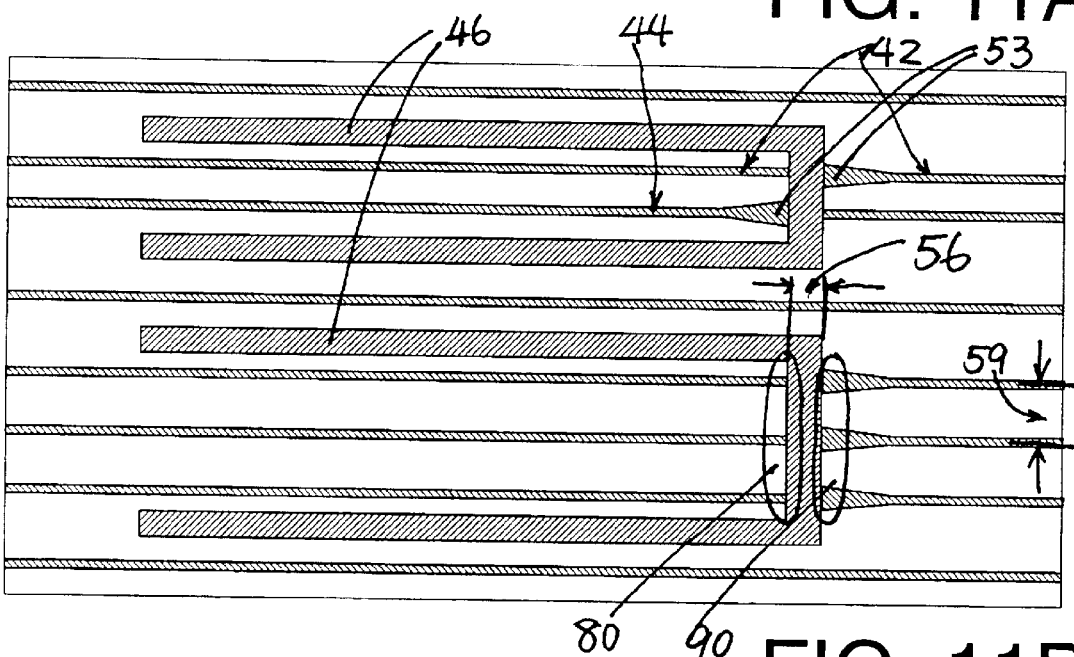

FIG. 11 (comprising FIGS. 11A–11B) is a diagrammatic view of vertical optical switch array. The FIG. 11A shows a diagrammatic view of tapered optical waveguide 53 geometry (either symmetric or asymmetric tapers) at the receiver waveguide ports 90 on the vertical optical switch. The tapered waveguides 53 at the receiver waveguide ports 90 are lithographically defined and fabricated by using the step shown in FIG. 5. The vertical optical switch moves the sender waveguide port 80 relative to the multiple cores of receiver waveguide ports 90. The multiple cores of receiver waveguide ports 90 are positioned along different waveguide layers and there are stacked vertically with each other. Therefore, the diagrammatic views as shown in FIG. 11A and FIG. 11B does not explicitly show the multiple cores of receiver waveguide ports 90 as illustrated in FIG. 10A. The waveguide cores 50 of sender waveguide ports 80 are located on top of the moving cantilever flexure 170 with an appropriate waveguide width 52. The sender and receiver waveguide ports 80, 90 are separated by the micromachined free space 46 with an appropriate gap width 56. The individual waveguides at receiver ports 90 are isolated appropriately from the neighboring waveguides with horizontal channel separation widths 59 and vertical channel separation widths 58. The core 50 of tapered waveguide 53 is wider than the ordinary waveguide cores 50. The taper length 55, taper width 54, channel separation widths 58, 59, waveguide core width 52 of the receiver waveguide ports 90 and micromachined gap width 56 defines the boundary conditions for tapered waveguide 53, which in turn influences the vertical optical switch's insertion losses and signal uniformity. The tapered waveguide 53 can reduce insertion losses and promote equalized optical power delivery among the receiver waveguide ports 90. When multiple cores of optical waveguides are stacked with each other, it is not always possible to perfectly align the cores between layers. Therefore the perfectly aligned sender waveguide port 80 and receiver waveguide port 90 cannot be maintained for the vertical optical switches with misaligned cores. Here the enlarged waveguide width at the tapered waveguide 53 also reduces alignment requirement among sender waveguide ports 80 and receiver waveguide ports 90 related to the misaligned cores to achieve low insertion losses and good signal uniformity. It can result in a drastic reduction on the controller complexity of vertical optical switch and lithographic alignment requirements too. Note that the integrated nature of vertical optical switch allows waveguide thickness and gap width 56 between the sender and receiver waveguide ports 80, 90 to be precisely pre-aligned. Again the moving cantilever flexure 180 provides a swinging movement to position and align the sender waveguide port 80 relative to the receiver waveguide ports 90.

The finite-difference beam propagation method (FD-BPM) simulation suggests that it is quite feasible to achieve the vertical optical switching with a low insertion loss by using the tapered waveguide 53, which is also insensitive to the alignment accuracy. The two-dimensional FD-BPM simulations are performed using a 1550 nm signal wavelength on the micromachined silica glass PLC boundary conditions outlined below. The PLC core has 8 $\mu$m×8 $\mu$m dimension and the refractive indices for core and cladding are set to be 1.4538 and 1.444 to yield a high-delta of 0.67%. In this boundary condition, the minimum bending radius for a nominal waveguide bending loss becomes about 4 to 5 mm. The sender waveguide is a straight waveguide segment on top of the moving cantilever flexure 170 and the receiver waveguide is a tapered waveguide 53 with symmetric tapers. The taper width 54 and taper length 55 are set to be 2 $\mu$m and 600 $\mu$m respectively. The micromachined gap width 56 (i.e. port separation between the sender and receiver ports) are set from 10 $\mu$m to 50 $\mu$m with an increment of 10 $\mu$m and the neighboring channels at the receiver ports are separated 6 $\mu$m apart. The FD-BPM simulation results suggest that a slight misalignment between the sender waveguide port 80 and receiver waveguide port 90, perhaps in range of couple of micrometers, does not increase the insertion loss significantly. The following table also summarizes the influence of micromachined gap width 56 to the vertical optical switch's coupling efficiency by assuming that the sender waveguide port 80 is aligned to the center of tapered receiver waveguide port 90.

| Micromachined Gap Width | Coupling Efficiency of MOEM-WS |
|---|---|
| 10 $\mu$m | 97.0% |
| 20 $\mu$m | 96.7% |
| 30 $\mu$m | 96.3% |
| 40 $\mu$m | 95.8% |
| 50 $\mu$m | 95.0% |

The relationship between channel separation length 58 and signal crosstalk among channels are summarized in the following table by using the same boundary conditions and the micromachined gap width 56 of 20 $\mu$m. This relationship indicates that a nominal channel separation about 6 $\mu$m to 8 $\mu$m is sufficient enough for good channel isolation with negligible crosstalks.

| Channel Separation Length | Crosstalk between Channels |
|---|---|
| 4 $\mu$m | 7% |
| 6 $\mu$m | <0.1% |
| 8 $\mu$m | <0.1% |

The FIG. 11B is a diagrammatic view of another embodiment of vertical optical switches, showing a pair of waveguide channels as well as three vertical optical waveguide channels linked together. The full-duplex vertical optical switch has a pair of waveguide channels at both ports of sender and receiver waveguides 80, 90. The pair of waveguide channels is composed of one forward channel waveguide 42 and one backward channel waveguide 44. It supports concurrent signal propagation in both forward and backward directions in order to allow bi-directional and full-duplex signal transmissions. Note that the upper core channel of the receiver waveguide port 90 is tapered for the forward channel waveguide 42, while the lower core of the sender waveguide port 80 is tapered for the backward channel waveguide. The moving cantilever flexure 180 moves and aligns the cores of sender waveguide port 80 to the multiples cores of receiver waveguide port 90 simultaneously. In the embodiment of three vertical optical waveguide channels linked together, a single moving cantilever flexure port 180 moves and aligns the three cores of sender waveguide port 80 to the multiple cores of receiver waveguide port 90 simultaneously.

Figure 12A:
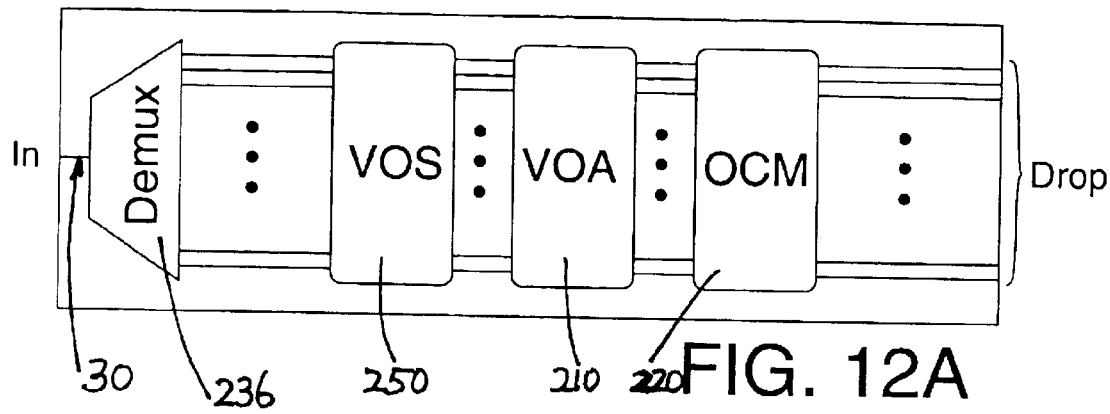
FIG. 12 (comprising FIGS. 12A–12C) is a diagrammatic view of monolithically integrated smart OADM module on the multifunctional IOM platform.
Figure 12B:
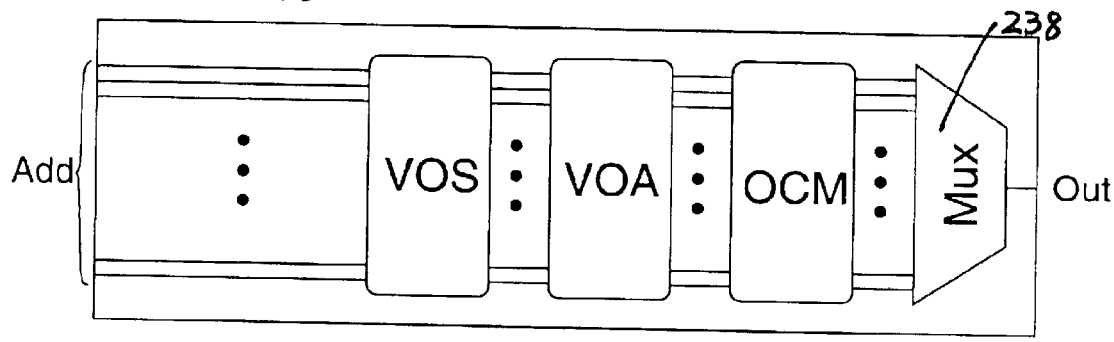
Figure 12C:
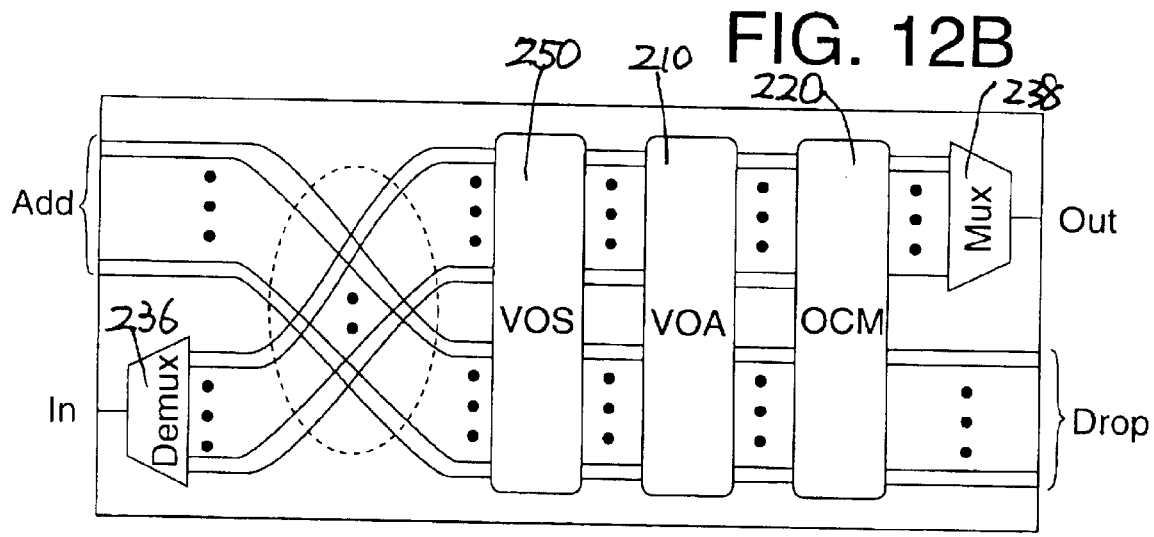

FIG. 12 (comprising FIGS. 12A–12C) is a diagrammatic view of monolithically integrated smart OADM module based on the multifunctional IOM platform. Smart OADM (S-OADM) module is composed of two waveguide layers with five distinctive optical stages: demultiplexer filter 236, vertical optical switch 250, VOA 210, optical channel monitor 220, and multiplexer filter 238 stages. The first waveguide layer of S-OADM shown in FIG. 12A consists of arrayed waveguide grating demultiplexing filter 236, VOS 250, VOA 210, and OCM 220 stages in cascade and it interfaces with one input port and multiple drop ports. The second waveguide layer of S-OADM shown in FIG. 12B consists of VOS 250, VOA 210, OCM 220, and arrayed waveguide grating multiplexer filter 238 in cascade and it interfaces with multiple add ports and one output port. Two waveguide layers are stacked together to yield a diagrammatic view as shown in FIG. 12C. The first and second waveguide layers interact with each other at the VOS 250 stage, where multiple ports of demultiplexed input signal on the first waveguide layer and add ports on the second waveguide layer can be individually coupled to multiple VOA input ports for both first and second waveguide layers. Due to the unique device structure of AWG filter 236, 238 as shown in FIG. 12A and FIG. 12C, the S-OADM requires a crossconnecting network of optical waveguides in front of the VOA 210 stage. Single layer implementation of the crossconnecting network on the monolithically integrated OADM module will accompany many unavoidable waveguide crossings to introduce crosstalks and to increase insertion losses. But, two distinctive waveguide layers of S-OADM eliminate the direct waveguide crossings at the crossconnecting network, because the crossconnect networks are implemented by using two optical waveguide layers to eliminate all possible waveguide crossings. FIG. 12C shows two waveguide layers being combined utilizing the multifunctional IOM platform, wherein a fully integrated S-OADM is implemented. In S-OADM, a proper operation of demultiplexer/multiplexer filters 236, 238, VOA 210, and OCM 220 does not depend to the particular assignment of these stage to a specific waveguide layer. Furthermore, VOS 250, VOA 210, and OCM 220 can be configured in all permissible serial interconnection orders within the monolithically integrated S-AODM. Even though it is not explicitly depicted in FIG. 12, electronic/photonic chips 60 for optical detectors 62, switch drivers 252, VOA drivers 212, and controllers 222 can be mounted on the micromachined PLC.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed:

1. A multifunctional intelligent optical module platform, capable of constructing optical channel monitor, comprises:

a substrate with planar lightwave circuit fabricated thereto;

light-transmitting waveguides of said planar lightwave comprising first and second waveguides, wherein said first waveguide is an optical pass-through waveguide interfaced with light-transmitting optical fibers, and said second waveguide is a single or a plurality of optical signal-tap waveguide in order to couple out a portion of optical signals from said optical pass-through waveguide;

a signal branching waveguide structure, wherein said optical pass-through waveguide and said optical signal-tap waveguide interface with each other through said signal branching waveguide structure;

a single or a plurality of trench with substantially vertical sidewalls terminating said optical signal-tap waveguide;

a single or a plurality of micro mirror with a small footprint size being inserted into said trench in order to couple out optical signals from cores of said optical signal-tap waveguide in a direction substantially normal to major surfaces of said planar lightwave circuit; and a single or a plurality of electronic chip, photonic chip, or any combination thereof being interfaced to said planar lightwave circuit in order to provide electrical-to-optical signal conversion, optical-to-electrical signal conversion, information processing, feed-back control, signal driver, external data communication, or any combinations thereof.

2. The multifunctional intelligent optical module platform, as recited in claim 1, further comprising a parallel array of said light-transmitting waveguides, said trench, said micro mirror, said electronic chip, and said photonic chip in order to interface with a plurality of parallel optical signals from an array of optical fibers, and further wherein, said parallel array supporting optical signal propagations in both forward and backward directions.

3. The multifunctional intelligent optical module platform as recited in claim 1, wherein said light-transmitting waveguide supporting a single or a plurality of electromagnetic wave propagation mode and said light-transmitting waveguide comprising a core and adjacent cladding composed of doped silica glass, polymer, SiON, silicon, or any other optical waveguide material, and further wherein, device structures for said light-transmitting waveguide comprising buried-type, ridge-type, step-index, or graded-index waveguide.

4. The multifunctional intelligent optical module platform as recited in claim 1, wherein said signal branching waveguide structure comprising directional coupler, Y-branch, wavelength insensitive coupler, or any other waveguide branching structure, and further wherein, cores of said optical signal-tap waveguide being gradually tapered to wider cores at trench before interfacing with said vertical sidewalls on waveguide-to-trench interfaces.

5. The multifunctional intelligent optical module platform as recited in claim 1, wherein said trench intersecting cores of said optical signal-tap waveguide at a tilted angle in order to reduce back-reflections by adjusting optical signal's incident angle on said waveguide-to-trench interfaces be tilted from a substantially normal angle.

6. The multifunctional intelligent optical module platform as recited in claim 1, further comprising a single or plurality of variable optical attenuator, optical switch, and arrayed waveguide grating filter being serially interconnected with each other in all possible serial combinations on said planar lightwave circuit.

7. The multifunctional intelligent optical module platform as recited in claim 1, further comprising a planar lens array in order to collimate or focus the diverging optical beams reflected from said micro mirror, wherein said planar lens array changing optical propagating directions through refractive index changes or lens surface changes, and further wherein, said micro mirror being micromachined silicon mirror, injection-molded micro mirror, or any other micro mirror in an array configuration.

8. The multifunctional intelligent optical module platform as recited in claim 1, to deliver a spectral optical channel monitor by further comprising:
   a narrow and two-sided trench intersecting both said optical pass-through waveguide and said optical signal-tap waveguide at a tilted angle;
   a thin-film filter plate being inserted into said narrow and two-sided trench, and being bonded by using adhesive materials with a reflective index being closely matched to cores of said light-transmitting waveguides, wherein said thin-film filter plate exhibiting wavelength selective characteristics by selectively transmitting and reflecting optical signals based on said optical signals' wavelength and said thin-film filter plate's spectral response;
   a third waveguide positioned close to said optical pass-through waveguide in order to collect reflected optical signals from said thin-film filter plate at a cross point of said narrow and two-sided trench and said optical pass-through waveguide;
   a fourth waveguide positioned closed to said optical signal-tap waveguide in order to collect reflected optical signals from said thin-film filter plate at a cross point of said narrow and two-sided trench and said optical signal-tap waveguide;
   a single or a plurality of trench with substantially vertical sidewalls terminating said third waveguide and said fourth waveguide;
   a single or a plurality of micromachined silicon mirror with a small footprint size being inserted into said single or a plurality of trench through a substrate of said planar lightwave circuit in order to couple out optical signals from cores of said third waveguide and said fourth waveguide in a direction substantially normal to major surfaces of said planar lightwave circuit; and
   a single or a plurality of electronic chip, photonic chip, or any combination thereof being bonded to said planar lightwave circuit in order to provide electrical-to-optical signal conversion, optical-to-electrical signal conversion, information processing, feed-back control, signal driver, external data communication, or any combinations thereof.

9. The spectral optical channel monitor as recited in claim 8, further comprising a parallel array of said light-transmitting waveguide, said narrow and two-sided trench, said thin-film filter plate, said trench with substantially vertical sidewalls, said micromachined silicon mirror, said electronic chip, and said photonic chip in order to interface with a plurality of parallel optical signals from an array of optical fibers.

10. The spectral optical channel monitor as recited in claim 8, wherein said light-transmitting waveguides comprising a plurality of said optical pass-through waveguide arranged in an one-dimensional array configuration to propagate optical signals in both forward and backward directions, and further wherein, even-numbered components for said optical pass-through waveguide to propagate optical signals in a forward direction, while odd-numbered components for said optical pass-through waveguide to propagate optical signals in a backward direction, and said optical pass-through waveguide for said odd-numbered components and said even-numbered components being interfaced with a single or a plurality of optical signal-tap waveguide in order to couple out a portion of optical signals out of said optical pass-through waveguide and to continuously monitor optical signals.

11. The multifunctional intelligent optical module platform as recited in claim 1, further constructing a dynamic channel controller, wherein a single or plurality of variable optical attenuator being inserted along a single or plurality of said optical pass-through waveguide of the optical channel monitor, and said variable optical attenuator being placed either before or after said signal branching waveguide structure, and further wherein, said variable optical attenuator operating based on the optical signal information from said optical channel monitor, and said optical channel monitor being either regular optical channel monitor or spectral optical channel monitor.

12. The dynamic channel controller as recited in claim 11, further constructing a dynamic variable optical attenuation multiplexer by further comprising arrayed waveguide grating filter, wherein said arrayed waveguide grating filter being interfaced with a plurality of said optical pass-through waveguide and being placed serially after stages of said variable optical attenuator and said optical channel monitor.

13. The dynamic channel controller as recited in claim 11, further constructing a smart optical switch by further comprising a single or a plurality of optical add/drop switch, wherein a plurality of input, add, output, and drop ports of said optical add/drop switch being interfaced with a plurality of said optical pass-through waveguide, and further wherein, stages of said variable optical attenuator, said optical add/drop switch, and said optical channel monitor can be serially interconnected with each in all possible serial combinations.

14. The dynamic channel controller as recited in claim 11, further constructing a smart optical add/drop multiplexing element by comprising serially interconnected stages of:
   an arrayed waveguide grating demultiplexer filter on a first waveguide layer of planar lightwave circuit and a plurality of add port on a second waveguide layer of said planar lightwave circuit;
   a plurality of vertical optical switch on said first waveguide layer and said second waveguide layer of said planar lightwave circuit;
   a plurality of variable optical attenuators on said first waveguide layer and said second waveguide layer of said planar lightwave circuit;
   a plurality of optical channel monitor on said first waveguide layer and said second waveguide layer of said planar lightwave circuit; and
   a plurality of drop port on said first waveguide layer of said planar lightwave circuit and an arrayed waveguide grating multiplexer filter on said second waveguide layer of said planar lightwave circuit.

15. The smart optical add/drop multiplexing element as recited in claim 14, wherein said vertical optical switch, said variable optical attenuator, and said optical channel monitor being configured with all possible serial combinations.

16. The smart optical add/drop multiplexing element as recited in claim 14, further comprising a single or a plurality of external optical amplifiers before or after said smart optical add/drop multiplexing element, and further wherein, a channel-based quality-of-service control method with variable priority being delivered through a dynamic attenuation level control of said variable optical attenuators after processing information on said optical amplifier, said arrayed waveguide grating demultiplexer filter, said vertical optical switch, said variable optical attenuator, said optical channel monitor, and said arrayed waveguide grating multiplexer filter.

17. A single or a plurality of silicon mirror with a small footprint size as recited in claim 1, having a method of fabrication comprising steps of:

(a) lithographically pattern and dry etch microstructures on bottom surface of first silicon wafer;

(b) bond said first silicon wafer to a second silicon wafer;

(c) lithographically pattern and anisotropically wet etch a top surface of said first silicon wafer to form said silicon mirror;

(d) lithographically pattern and dry etch said first silicon wafer further to release unwanted silicon areas and to define vertical sidewalls of said silicon mirror; and (e) deposit a layer of reflecting material on surfaces of said silicon mirror.

18. The method of fabricating as recited in claim 17, wherein said silicon mirror further comprising substantially 45-degree silicon mirrors by utilizing said first silicon wafer with a major surface being prepared in an appropriate crystalline orientation, and further wherein, said major surface's crystal orientation for said first silicon wafer being tilted appropriately to yield said substantially 4s-degree silicon mirrors.

19. A vertical optical switching element comprising;

a first waveguide layer deposited on planar lightwave circuit substrate, wherein a single or plurality of light-transmitting waveguide being formed;

a second waveguide layer deposited on planar lightwave circuit substrate, wherein a single or plurality of light-transmitting waveguide being formed, and further wherein, said light-transmitting waveguide on said second waveguide layer being positioned precisely relative to said light-transmitting waveguide on said first waveguide layer;

a cantilever flexure comprising a single or a plurality of light-transmitting waveguide port from said first waveguide layer and said second waveguide layer, wherein said cantilever flexure being micromachined on a planar lightwave circuit platform and capable of placing itself in first position or second position;

a stationary waveguide port comprising a single or a plurality of light-transmitting waveguide from said first waveguide layer and said second waveguide layer, wherein said stationary waveguide port and said cantilever flexure is aligned in a substantially collinear configuration; and a means of moving said cantilever flexure relative to said stationary waveguide port in order to couple optical signals between said light-transmitting waveguide of said first waveguide layer and said second waveguide layer.

20. The vertical optical switching element as recite in claim 19, wherein said light-transmitting waveguide supporting a single or a plurality of electromagnetic wave propagation mode and said light-transmitting waveguide comprising a core and adjacent cladding composed of doped silica glass, polymer, SiON, silicon, or any other optical waveguide material, and further wherein, device structures for said light-transmitting waveguide comprising buried-type, ridge-type, step-index, or graded-index waveguide.

21. The vertical optical switching element as recite in claim 19, wherein said light-transmitting waveguide ports being tapered to wider cores in order to increase optical coupling efficiency and alignment tolerance of said vertical optical switching element.

22. The vertical optical switching element as recite in claim 19, further comprising a plurality of said cantilever flexure in an array configuration on said planar lightwave circuit, and further wherein, said cantilever flexure comprising a plurality of said light-transmitting waveguide port to allow simultaneous switching of said vertical optical switching elements.

23. The vertical optical switching element as recite in claim 19, further supporting optical signal propagations in forward and backward directions, wherein said light-transmitting waveguide ports positioned at receiver sides being tapers to wider cores in order to increase optical coupling efficiency and alignment tolerance of said vertical optical switching element.

24. The vertical optical switching element as cite in claim 19, wherein said means of moving comprises a single or a plurality of actuation device utilizing electrostatic, electromagnetic, thermal, shape memory alloy, impact, piezoelectric, or any other MEMS actuation mechanism, and further wherein, said actuation device is monolithically integrated with said planar lightwave circuit or separately attached to said planar lightwave circuit through hybrid integration of said actuation device and said planar lightwave circuit.

* * * * *